(12) United States Patent
Mattingly et al.

(10) Patent No.: US 10,368,120 B2
(45) Date of Patent: Jul. 30, 2019

(54) AVATAR INTEGRATED SHARED MEDIA EXPERIENCE

(71) Applicant: Microsoft Technology Licensing, LLC, Redmond, WA (US)

(72) Inventors: Andrew Lawrence Mattingly, Kirkland, WA (US); Brian Charles Kramp, Kirkland, WA (US); Thomas M. Soemo, Redmond, WA (US); Eddie Mays, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/234,812

(22) Filed: Aug. 11, 2016

(65) Prior Publication Data
US 2017/0041658 A1    Feb. 9, 2017

Related U.S. Application Data

(63) Continuation of application No. 14/833,713, filed on Aug. 24, 2015, now Pat. No. 9,423,945, which is a
(Continued)

(51) Int. Cl.
*G06F 3/0482* (2013.01)
*H04N 21/431* (2011.01)
(Continued)

(52) U.S. Cl.
CPC ......... *H04N 21/4312* (2013.01); *G06F 3/048* (2013.01); *G06F 3/0482* (2013.01);
(Continued)

(58) Field of Classification Search
CPC ... G06F 3/04847; G06F 3/0482; G06F 3/0484
(Continued)

(56) References Cited

U.S. PATENT DOCUMENTS 5,808,662 A   9/1998 Kinney et al.
6,064,383 A   5/2000 Skelly
(Continued)

FOREIGN PATENT DOCUMENTS

CN    1648856 A    8/2005
CN    1705928 A    12/2005
(Continued)

OTHER PUBLICATIONS

Japan Application No. 2012-513259; Notice of Reason for Rejection; dated Mar. 4, 2014; 5 pages.
(Continued)

*Primary Examiner* — Andrea C Leggett
(74) *Attorney, Agent, or Firm* — Alleman Hall Creasman & Tuttle LLP

(57) ABSTRACT

A method and system are disclosed in which a group of people are able to replicate the physical world experience of going with a group of friends to pick a movie, watch the movie together, and provide commentary on the movie itself in the virtual world on a virtual couch while each user is sitting in different physical locations. Additionally, the virtual representation of the destination that the group of people are watching the movie together in can be themed to allow users to watch movies in different locations pivoting on special events or by the users choice.

19 Claims, 21 Drawing Sheets

Related U.S. Application Data continuation of application No. 14/188,334, filed on Feb. 24, 2014, now Pat. No. 9,118,737, which is a continuation of application No. 12/551,339, filed on Aug. 31, 2009, now Pat. No. 8,661,353.

(60) Provisional application No. 61/217,268, filed on May 29, 2009.

(51) Int. Cl.

| | |
|---|---|
| H04L 29/06 | (2006.01) |
| G06Q 10/10 | (2012.01) |
| H04N 21/4788 | (2011.01) |
| G06F 3/048 | (2013.01) |
| G06F 3/0484 | (2013.01) |
| H04N 21/2387 | (2011.01) |
| H04N 21/254 | (2011.01) |
| H04N 21/4627 | (2011.01) |
| H04N 21/6587 | (2011.01) |

(52) U.S. Cl.
CPC ...... *G06F 3/04842* (2013.01); *G06F 3/04847* (2013.01); *G06Q 10/10* (2013.01); *H04L 29/06* (2013.01); *H04L 65/403* (2013.01); *H04N 21/2387* (2013.01); *H04N 21/2541* (2013.01); *H04N 21/4627* (2013.01); *H04N 21/4788* (2013.01); *H04N 21/6587* (2013.01)

(58) Field of Classification Search
USPC ........................................ 715/720
See application file for complete search history.

(56) References Cited

U.S. PATENT DOCUMENTS

| | | | |
|---|---|---|---|
| 7,493,291 B2 | 2/2009 | Simelius | |
| 7,562,117 B2 | 7/2009 | Rosenberg | |
| 8,661,353 B2 | 2/2014 | Mattingly et al. | |
| 2002/0042834 A1 | 4/2002 | Kremens et al. | |
| 2002/0053845 A1 | 5/2002 | Herndon et al. | |
| 2004/0199923 A1 | 10/2004 | Russek | |
| 2005/0132288 A1 | 6/2005 | Kim et al. | |
| 2006/0288074 A1 | 12/2006 | Rosenberg | |
| 2007/0196802 A1 | 8/2007 | Beletski et al. | |
| 2007/0260984 A1 | 11/2007 | Marks et al. | |
| 2007/0271338 A1* | 11/2007 | Anschutz | G06Q 10/10 709/204 |
| 2008/0059570 A1 | 3/2008 | Bill | |
| 2008/0215875 A1 | 9/2008 | Fischer et al. | |
| 2008/0215971 A1 | 9/2008 | Gillo et al. | |
| 2008/0215972 A1 | 9/2008 | Zalewski et al. | |
| 2008/0215975 A1 | 9/2008 | Harrison et al. | |
| 2008/0275769 A1 | 11/2008 | Shao | |
| 2009/0044216 A1* | 2/2009 | McNicoll | G11B 27/105 725/5 |
| 2009/0063995 A1 | 3/2009 | Baron et al. | |
| 2009/0094656 A1 | 4/2009 | Carlucci | |
| 2009/0109213 A1 | 4/2009 | Hamilton et al. | |
| 2009/0132284 A1 | 5/2009 | Fey et al. | |
| 2009/0328122 A1 | 12/2009 | Amento et al. | |
| 2010/0153577 A1* | 6/2010 | Wohlert | H04N 7/17318 709/231 |
| 2010/0205628 A1 | 8/2010 | Davis et al. | |

FOREIGN PATENT DOCUMENTS

| | | |
|---|---|---|
| JP | 10208240 A | 8/1998 |
| JP | 2000-040088 A | 2/2000 |
| JP | 2003-337776 A | 11/2003 |
| JP | 2004-062812 A | 2/2004 |
| JP | 2005-269557 A | 9/2005 |
| JP | 2007-115117 A | 5/2007 |
| JP | 2008-539611 A | 11/2008 |
| KR | 10-2003-0031956 A | 4/2003 |
| KR | 10-2007-0083269 A | 8/2007 |
| KR | 10-2008-0001073 A | 1/2008 |
| RU | 2259585 C2 | 8/2005 |
| WO | WO 2005/013617 A1 | 2/2005 |
| WO | WO 2006/113626 A2 | 10/2006 |
| WO | 2007133847 A2 | 11/2007 |
| WO | WO 2007/133847 A2 | 11/2007 |
| WO | WO 2008/109299 A2 | 9/2008 |
| WO | WO 2008/149076 A2 | 12/2008 |

OTHER PUBLICATIONS

Russia Application No. 2011148384; Decision on Grant; dated Apr. 17, 2014; 15 pages.
U.S. Appl. No. 12/551,403; Final Office Action; dated Feb. 25, 2014; 14 pages.
Leading Social Viewing Platform View1gether.com Secures 'Series A' Investment, Apr. 29, 2009, View2Gether.com, 7 pages.
Oortle Overview, Oortle—Company Information on Oortle, http://www.tradevibes.com/company/provile.oortle, Downloaded from Internet May 22, 2009, 2 pages.
SeeToo Company Profile, CrunchBase, http://www.crunchbase.com/company/seetoo, Downloaded from Internet May 22, 2009, 5 pages.
Social Viewing, Social Viewing—Wikipedia, the free encyclopedia, http://en.wikipedia.org/wiki/Social.sub.—viewing, Downloaded from Internet May 22, 2009, 1 page.
PCT Application No. PCT/US2010/036428: International Search Report and Written Opinion of the International Searching Authority, dated Dec. 29, 2010, 10 pages.
PCT Application No. PCT/US2010/036539: International Search Report and Written Opinion of the International Searching Authority, dated Dec. 28, 2010, 8 pages.
Supplementary European Search Report issued for European Application No. EP 10781264, dated Oct. 31, 2012, 2 pages.
"First Office Action and Search Report Received in Chinese Patent Application No. 201080024658.6", dated Nov. 29, 2013, Filed Date: May 27, 2010, 11 Pages.
"Notice of Rejection Received in Japanese Patent Application No. 2012-513285", dated Jan. 27, 2014, Filed Date: May 28, 2010, 6 pages.
"Search Report Issued in European Patent Application No. 10781225.7", dated Jun. 4, 2013, 6 Pages.
"International Preliminary Report on Patentability Issued in PCT Patent Application No. PCT/US2010/036428", dated Dec. 8, 2011, 6 Pages.
"International Preliminary Report on Patentability Issued in PCT Patent Application No. PCT/US2010/036539", dated Dec. 8, 2011, 5 Pages.
"First Office Action Issued in Chinese Patent Application No. 201080024665.6", dated Sep. 18, 2012, 8 Pages.
"Office Action Issued in Korean Patent Application No. 10-2011-7028427", dated Feb. 12, 2016, 20 Pages.
"Office Action Issued in European Patent Application No. 107812251", dated Apr. 7, 2015, 4 Pages.
"Office Action Issued in European Patent Application No. 10781225.7", dated Nov. 21, 2014, 4 Pages.
"Second Office Action Issued in Chinese Patent Application No. 201080024658.6", dated Aug. 11, 2014, 8 Pages.
"Office Action Issued in European Patent Application No. 10781264.6", dated Nov. 20, 2014, 4 Pages.
"Search Report Issued in European Patent Application No. 10781264.6", dated Nov. 8, 2012, 7 Pages.
"Second Office Action issued in European Patent Application No. 10781264.6", dated Apr. 28, 2015, 3 Pages.
"Final Office Action Issued in U.S. Appl. No. 12/551,339", dated May 11, 2012, 23 Pages.
"Final Office Action Issued in U.S. Appl. No. 12/551,339", dated Dec. 7, 2012, 25 Pages.
"Non-Final Office Action Issued in U.S. Appl. No. 12/551,339", dated Apr. 26, 2013, 24 Pages.
"Non-Final Office Action Issued in U.S. Appl. No. 12/551,339", dated Aug. 17, 2012, 23 Pages.

(56) References Cited

OTHER PUBLICATIONS

"Non-Final Office Action Issued in U.S. Appl. No. 12/551,339", dated Jan. 10, 2012, 23 Pages.
"Office Action Issued in Canadian Patent Application No. 2,760,236", dated May 11, 2017, 4 Pages.
"Final Office Action Issued in U.S. Appl. No. 12/551,403", dated Mar. 16, 2012, 12 Pages.
"Non-Final Office Action Issued in U.S. Appl. No. 12/551,403", dated Aug. 14, 2013, 10 Pages.
"Non-final Office Action Issued in U.S. Appl. No. 12/551,403", dated Oct. 7, 2011, 11 Pages.
"Non-Final Office Action Issued in U.S. Appl. No. 14/188,334", dated Aug. 29, 2014, 17 Pages.
"Office Action Issued in Canadian Patent Application No. 2,760,236", dated Jun. 21, 2016, 4 Pages.
"Non-Final Office Action Issued in U.S. Appl. No. 14/833,713", dated Feb. 11, 2016, 23 Pages.
"Notice of Allowance Issued in Japanese Patent Application No. 2012-513285", dated Jul. 23, 2014, 4 Pages.
"Office Action Issued in Canadian Patent Application No. 2760236", dated Mar. 15, 2018, 3 Pages.
"Office Action Issued in India Patent Application No. 09315/DELNP/2011", dated Nov. 29, 2018, 5 Pages.
"Office Action Issued in Indian Patent Application No. 09316/DELNP/2011", dated Nov. 29, 2018, 5 Pages.

* cited by examiner

AVATAR INTEGRATED SHARED MEDIA EXPERIENCE

CROSS REFERENCE TO RELATED APPLICATIONS

This application is a continuation of U.S. patent application Ser. No. 14/833,713, filed Aug. 24, 2015, which is a continuation of U.S. patent application Ser. No. 14/188,334, filed Feb. 24, 2014, now U.S. Pat. No. 9,118,737, which is a continuation of U.S. patent application Ser. No. 12/551,339, filed Aug. 31, 2009, now U.S. Pat. No. 8,661,353, which claims the benefit of U.S. Provisional Patent Application No. 61/217,268, filed May 29, 2009, the disclosures of which are incorporated herein by reference.

This application is also subject matter related to U.S. patent application Ser. No. 12/551,403, filed on August 31, 2009, entitled "Avatar Integrated Shared Media Selection," now abandoned, which is hereby incorporated by reference in its entirety.

BACKGROUND

The wide availability of data networks has enabled computing device users to remain connected to their provider networks and thus all of the data and services available via the Internet and other networks. The growth of such networks have also fueled the growth of community and social applications using computing devices such as mobile phones and personal computers. For example, networked multi-player gaming is generally available on both personal computers and game consoles. Such networked applications allow users to remain connected and to share online experiences without the need to be physically present in the same location.

However, may social activities remain out of reach of online networks. For example, networked social multimedia experiences, such as streaming video, for example, are not generally available or convenient to use.

In some cases, avatars may be used to enhance a group or online experience. An avatar can represent a user in a variety of contexts, including computer or video games, applications, chats, forums, communities, and instant messaging services. An avatar may be an object representing the embodiment of a user and may represent various actions and aspects of the user's personal, beliefs, interests, or social status. However, the use of avatars has not overcome the deficiencies of existing group and online systems and applications.

SUMMARY

One popular social activity is the viewing of movies and television shows. However, it is difficult for users who live in separate physical locations to conveniently decide on a movie or television show to watch together. For example, it may be difficult and cumbersome for a participant in an online group to suggest a movie and listen to suggestions from other members of the group. Furthermore, it may be difficult to communicate thoughts and feelings about the various suggested movie or television titles to the members of the group while at the same time maintaining a sense of fun and interaction that is typical of an in-person movie/television show selection experience. Even when the group has decided on what movie or television show to watch, it would be advantageous if the participants can continue to interact and communicate while the movie or show is being watched.

A method and system are disclosed herein in which a group of people may replicate the physical world experience of going with a group of friends to select a movie or show to watch together in a virtual world while the users are in different physical locations. Users of a group may nominate movie or television selections for group viewing. In one embodiment, a display at a user's location may render avatars representing the users of the group. Users may also select an emotion that the member wishes to express to the other users of the group.

In further embodiments, the users of the group may replicate the physical world experience of watching the movie or television show together and provide commentary on the movie or show in the virtual world on a virtual couch while each user is viewing the movie or show in different physical locations. Additionally, the virtual representation of the destination in which the group of people are watching the movie can be themed to allow users to watch movies in different locations pivoting on special events or by the users' choice.

DETAILED DESCRIPTION OF ILLUSTRATIVE EMBODIMENT

Figure 1:
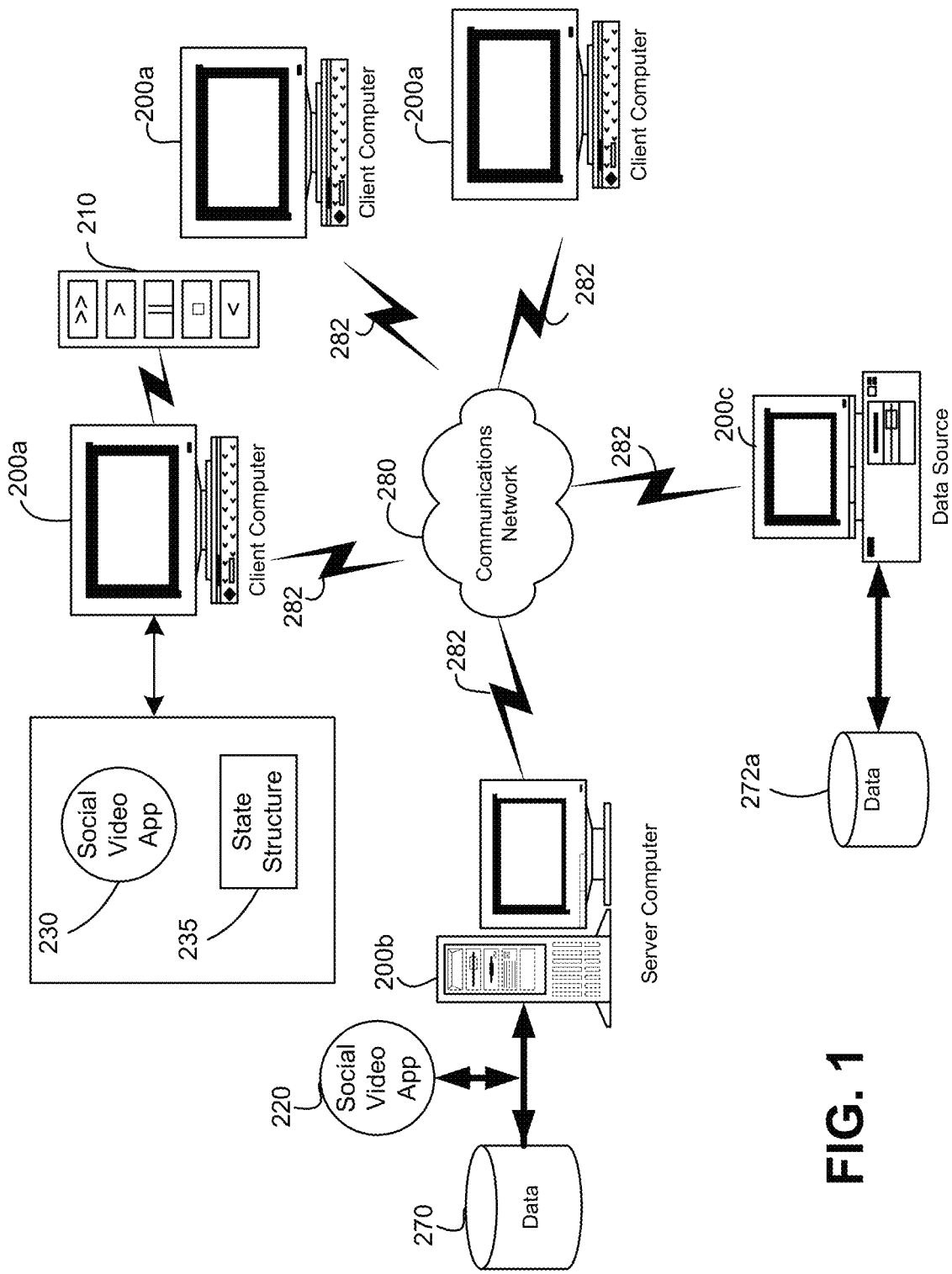
FIG. 1 is a block diagram of an example network configuration.

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

The following example embodiments describe the media nomination and selection process in the context of viewing movies and television shows. The selection of movies and television shows is exemplary, and those skilled in the art will recognize that the principles are readily applicable to the nomination and selection of other media types that may be shared among a group of users. Such media types may include any media file or application such as music files and video games. All such media types and applications are contemplated as within the scope of the present disclosure.

Many social activities have been replicated or simulated by networked or online activities. For example, group discussions have been simulated using on-line messaging or chat services. However, some social activities have been more difficult to replicate. For example, one popular social activity is the group viewing of movies and television shows. However, it is difficult for users who are in separate physical locations to conveniently decide on a movie or television show to watch together. For example, it may be difficult and cumbersome for a participant in an online group to suggest a movie and listen to suggestions from other members of the group. Furthermore, it may be difficult to communicate thoughts and feelings about the various suggested movie or television titles to the members of the group while at the same time maintaining a sense of fun and interaction that is typical of an in-person movie/television show selection experience. Even when the group has decided on what movie or television show to watch, it would be advantageous if the participants can continue to interact and communicate while the movie or show is being watched.

In various embodiments disclosed herein, a group of users may replicate the physical world experience of meeting with a group of friends to select a movie or television show to watch together. The experience may be replicated in a virtual world in which the users are in different physical locations and in communication via a network. Users of the group may nominate movie or television selections for group viewing. In one embodiment, a display at a user's location may render avatars representing the users of the group. Users may also select an emotion that the user wishes to express to the other users of the group.

According to the methods and systems described herein, a user in a group of users may be provided an opportunity to browse content made available by a system and/or service, such as for example Microsoft's XBOX 360 console and XBOX LIVE service, and to nominate specific content, such as movies or television shows, that they would like to watch. Once the group of users has nominated movies or television shows that they would like to watch, the users may discuss with each other, via for example their respective headset devices, regarding which movie or show they would like to watch together.

Each user may also have an avatar which is a virtual representation of his- or herself that may act out different "pick my movie" animations to attempt to convey the user's excitement with the particular movie or television show he or she has chosen. Many applications such as video games sometimes feature a user-created, system-wide avatar as a user-controlled character. Avatars can be graphical images that represent real persons in virtual or game space. Typically, a user may be able to customize body shape, gender, facial features, hair style, and clothing. This allows the user a more personalized and involved video gaming experience. For instance, the Nintendo Corporation has a user-created, system-wide avatar, the MII®, which a user may then use as his or her user-controlled character in video games that support this feature, such as WII SPORTS®.

Once a "leader" ultimately picks a particular piece of content, such as a particular movie, the chosen content may be watched by the group of users and their respective avatars may appear in a virtual "destination" to watch the movie together. The virtual destination and a representation of the group watching the content may appear on the display of each user's respective console, thus simulating a physical gathering of those users. The group of users may talk during the movie on their headsets and have their avatars perform emotions and gestures that the user in the physical world is feeling based on the content being played.

Additionally, the system may provide themed destinations that may be chosen by the system or by one or more of the users of the group viewing the content. For example, a content service provider, such as an online provider of movies that can be rented for view, may provide a themed destination that resembles a home theater environment. Another service provider may provide a themed destination that resembles a full theater. Other themed destinations may include ones that resemble a beach, aquarium, outer space, mountains, drive-in theater or any other destination. The themed destination may be chosen by a leader of the group or by the collective agreement of the users. Hidden/unlockable themes may also be provided based on events occurring around a user. For example, if one of the users in the group is having a birthday on that day, the system may provide a special destination where a birthday cake and balloons may appear as the users are watching a movie together.

Infrastructure for Supporting a Shared Media Nomination and Watching Experience

FIG. 1 illustrates an example network environment. Of course, actual network and database environments may be arranged in a variety of configurations; however, the example environment shown here provides a framework for understanding the type of environment in which an embodiment may operate.

The example network may include one or more client computers 200*a*, a server computer 200*b*, data source computers 200*c*, and/or databases 270, 272*a*, and 272*b*. The client computers 200*a* and the data source computers 200*c* may be in electronic communication with the server computer 200*b* by way of the communications network 280 (e.g., an intranet, the Internet or the like). The client computers 200*a* and data source computers 200*c* may be connected to the communications network by way of communications interfaces 282. The communications interfaces 282 can be any type of communications interfaces such as Ethernet connections, modem connections, wireless connections and so on.

The server computer 200*b* may provide management of the database 270 by way of database server system software such as MICROSOFT®'s SQL SERVER or the like. As such, server 200*b* may act as a storehouse of data from a variety of data sources and provides that data to a variety of data consumers.

In the example network environment of FIG. 1, a data source may be provided by data source computer 200*c*. Data source computer 200*c* may communicate data to server computer 200*b* via communications network 280, which may be a LAN, WAN, Intranet, Internet, or the like. Data source computer 200*c* may store data locally in database 272*a*, which may be database server or the like. The data provided by data source 200*c* can be combined and stored in a large database such as a data warehouse maintained by server 200*b*.

Client computers 200*a* that desire to use the data stored by server computer 200*b* can access the database 270 via communications network 280. Client computers 200a access the data by way of, for example, a query, a form, etc. It will be appreciated that any configuration of computers may be employed.

The client computers 200a depicted in FIG. 1 may be PCs or game consoles, for example. Two or more clients 200a may form a "party." A "social video application" 220 running on the server 200b may designate one of the clients 200a as the "remote holder." The remote holder may be the first member of the party to request a network session. Such a request may be, for example, a request for streaming video. The remote holder may then invite other clients to establish a networked, social multimedia experience, i.e., to join the party.

The remote holder may have control over a shared "remote control" 210 that controls content playback. When the remote holder presses play, pause, reverse, or fast-forward, for example, the remote holder's "state" may be sent to all connected users in a group, who see it and synchronize to it, causing the same action to occur on their client. The other users may have the ability to play, pause, and request remote holder status by sending their own state to the remote holder. Such actions may need approval from the current remote holder to take effect. Users may also have the ability to leave the playback session.

The video may be kept synchronized by keeping all users updated on the remote holder's state. The remote holder's state may be a structure 235 that contains information on playback status (e.g., playing, paused, initializing, etc.), an identifier associated with the content being viewed, and a current time code associated with the content. The remote holder may maintain its state (i.e., keep it up-to-date), and send it to all the other users when it changes. The other users may then see the new state, compare their own time code and playback state to the remote holder's, and then take action accordingly. Each client may have its own respective social video application 230, and may maintain its own respective state structure 235.

If a user's state is different from that of the remote holder, it may be updated (playing may become paused, for example). If a user's time code is too different from the remote holder's, then a "seek" operation may be performed to the remote holder's reported time code. The user may be responsible for predicting, based on "pre-buffering times," how long it will take the seek call to complete, and compensate by adjusting the targeted time code.

Users may also be enabled to make requests of the remote holder by sending the remote holder and all other users an updated state that differs from the remote holder's state. When the remote holder sees this state, it may be taken as a request. The remote holder may update its state to reflect the requested changes. Only then do the other users (including the user that made the request) change their state. The same process can be used to request remote holder status.

In an example embodiment, any user can be the remote holder, but only one user can be the remote holder at any time. Any member may be promoted to remote holder, demoting the current remote holder to a normal user. The "current" remote holder is the only user who can "pass the remote" to another user. The server may keep track of the identify of the current remote holder.

Multiparty voice chat may be integrated into the experience, allowing members to comment on the video. Thus, a group of people may be enabled to share the experience of watching a video together as if they were in the same room, without being physically present together. All users may have the same access to voice chat. That is, any user may speak whenever he chooses.

Multiparty voice chat may require a certain level of synchronization among the clients that form the party. If any client were allowed to be even a few seconds out of synch with the rest of the party, comments made over the chat may not make sense. Additionally, feedback from the audio of one client sent over voice chat could be very disruptive if it's not closely in-sync with what other users are hearing from their own video.

Fast-forward and reverse may be treated differently from play, pause, and seek commands. When the remote holder elects to fast-forward or reverse, the other clients may simply pause playback. When the remote holder finds the time in the video from which playback should resume, the other clients may receive the remote holder's updated state, and issue a "seek" command telling them to resume playback from the time index the remote holder has selected. This may eliminate potential synchronization issues that may be caused by fast-forward or reverse speeds being slightly different on different users' client computers.

A fully social experience may be created where people are not only watching the same video, but also using graphical user avatars to create a virtual viewing environment such as a virtual entertainment room or movie theater. The users may be represented graphically in front of the video, and may be enabled to use animations, text chat, and voice chat to interact with each other.

For example, the introduction of graphical avatars into the shared video experience may add another dimension to the experience by giving users a sense of identity within the virtual living room. Each user watching the video may be represented by their own customized avatar. The avatars of every person in the session may be rendered on everyone else's television or monitor, resulting in a group of avatars that appear to be watching the video in a virtual environment. Each user may be enabled to trigger animations and text messages (in the form of "speech balloons," for example) for their avatar. Such animations and text messages may be rendered on every other users' television or monitor.

Figure 2:
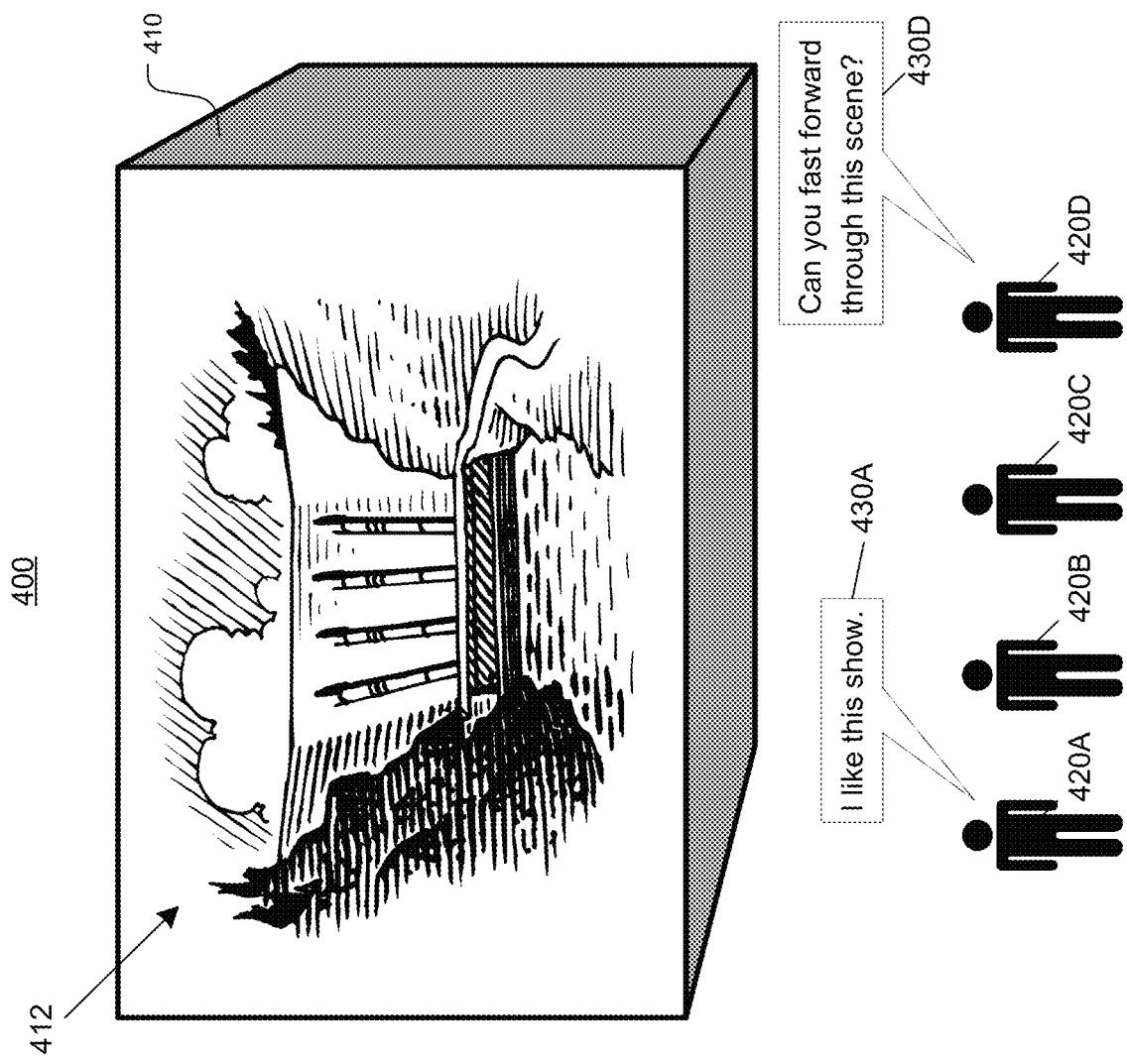
FIG. 2 depicts an example user interface that maybe provided during a networked, social multimedia experience.

FIG. 2 depicts an example user interface 400 that maybe provided during a networked, social multimedia experience. The user interface 400 may be presented on respective video monitors provided at each client location. The same interface may be presented at each location.

In general, the user interface 400 may depict an area for displaying a movie. The area may be a virtual viewing environment such as a virtual living room or a virtual movie theater. As noted above, the scene providing the area for rendering the media may be referred to as the "destination" or "themed destination." Specifically, as shown in FIG. 2, the user interface 400 may include a video presentation portion 410, via which the video 412 is presented to the users. The user interface 400 may also include a respective avatar 420A-D corresponding to each of the users. The user interface 400 may also include a text chat area. As shown, text chat may be presented in the form of speech balloons 430A-D. Alternatively or additionally, text chat may be presented as scrolling text in a chat box portion of the user interface 400. Audio maybe presented via one or more speakers (not shown) provided at the client locations.

Each client may render its own themed destination. Thus, software may be provided on each client to enable the client to render its own themed destination. The themed destinations rendered on the several clients may be identical, or not.

When a user causes his or her avatar to gesticulate, the gesture may be presented at all the client locations in synchronicity. Similarly, when a user speaks or otherwise produces an audio event, e.g., through voice chat, or textual event, e.g., through text chat, the audio or text may be presented at all the client locations in synchronicity.

Figure 3A:
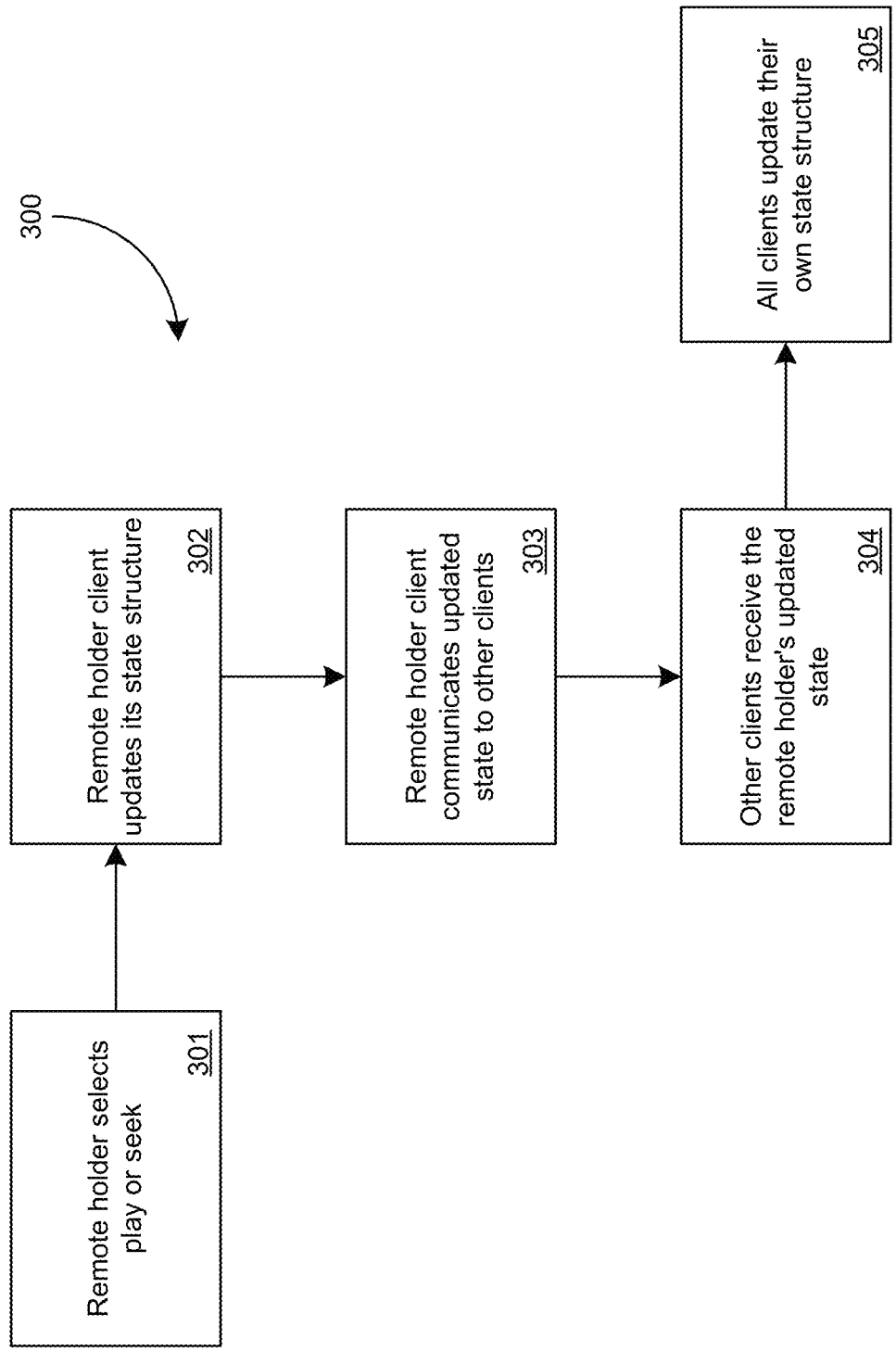
FIGS. 3A, 3B and 3C are flowcharts of example methods for synchronizing control commands in a networked, social multimedia environment.

FIG. 3A is a flowchart of an example method 300 for synchronizing play, pause, stop, and seek commands from the remote holder. At 301, the remote holder may select a "play," "pause," "stop," or "seek" operation, e.g., by pressing the play, pause, stop, or seek button on their game controller or remote control. At 302, in response to the remote holder's selection of the play, pause, stop, or seek operation, the remote holder client may update its state structure to reflect the change in time code and playback status.

At 303, the remote holder client communicates the remote holder's state structure to the other clients in the party. To maintain the highest level of synchronization among the several clients in the party, such updates should be communicated as frequently as possible. At 304, the other clients receive the remote holder's updated state. At 305, each client responds to the state change by updating its own state structure to conform to that of the remote holder.

The state structure from each client may be sent to every other client, so that every client always knows the current state of every other client in the party. Because the state structure contains information on playback status, an identifier associated with the content being viewed, and a current time code associated with the content, each client will then be performing the same operation, at the same place in the same content, at the same time.

Figure 3B:
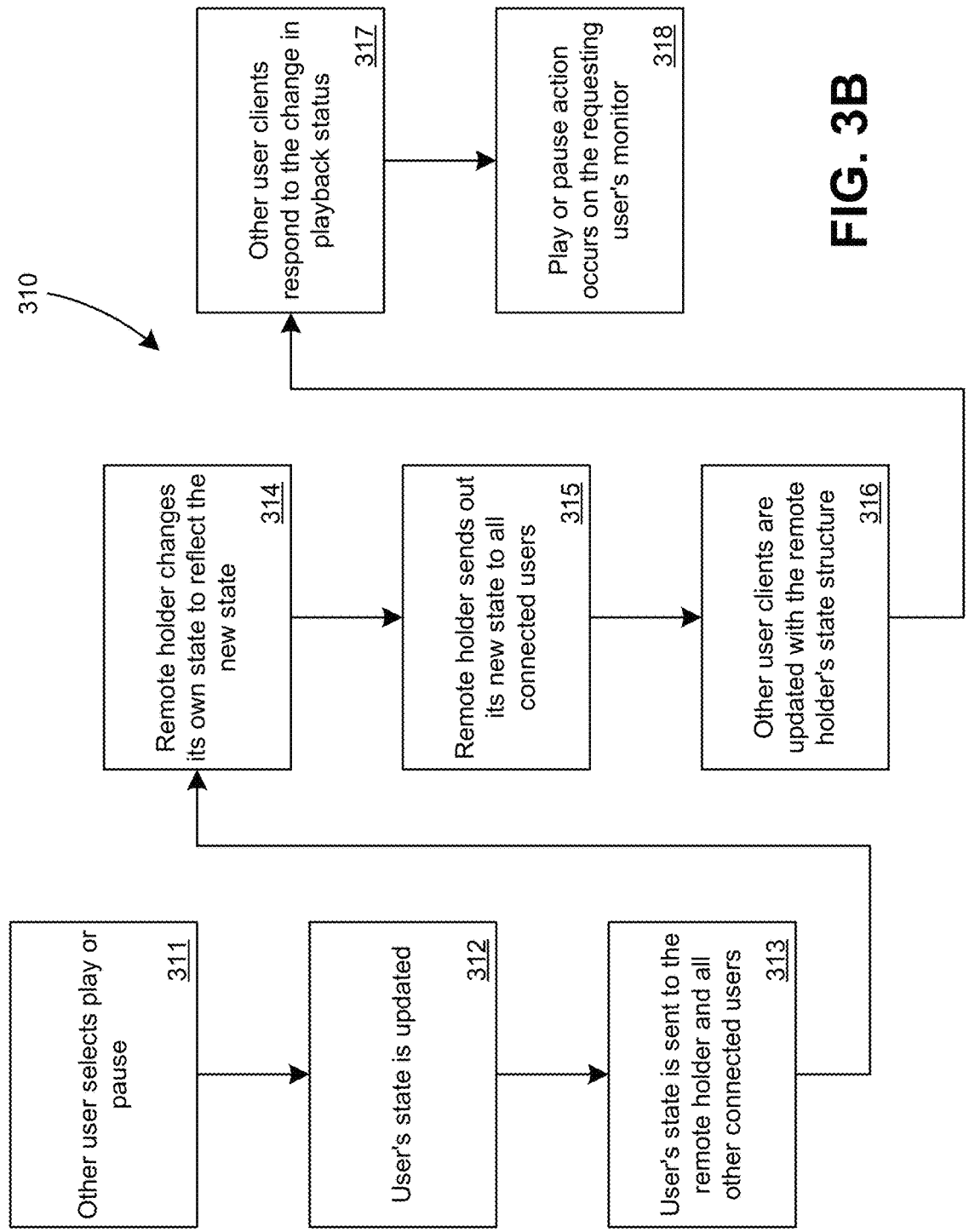

FIG. 3B is a flowchart of an example method 310 for synchronizing play or pause commands from a user who is not the remote holder. In an example embodiment, a user who is not the remote holder is not enabled to exercise a stop, seek, fast-forward, or reverse command. At 311, a non-remote holder user may select a "play" or "pause" operation, e.g., by pressing the play or pause button on their game controller or remote control. At 312, in response to the user's selection of the play or pause operation, the selecting user's client may update its state structure to reflect that a play or pause state has been requested.

At 313, the selecting user's client may send the selecting user's state to the remote holder client, as well as to all other members of the party. At 314, the remote holder client may receive the selecting user's state, from which it can determine that another member of the party has made a playback state change request. The remote holder client may change its own state to reflect the new state.

At 315, the remote holder client communicates the remote holder's state structure to the other clients in the party. To maintain the highest level of synchronization among the several clients in the party, such updates should be communicated as frequently as possible. At 316, the other clients receive the remote holder's updated state.

At 317, the other clients, including the user who made the original request, receive the remote holder's updated state, and respond to the state change by updating their own state structures to conform to that of the remote holder. At 318, the selected action occurs on the requesting user's client.

Figure 3C:
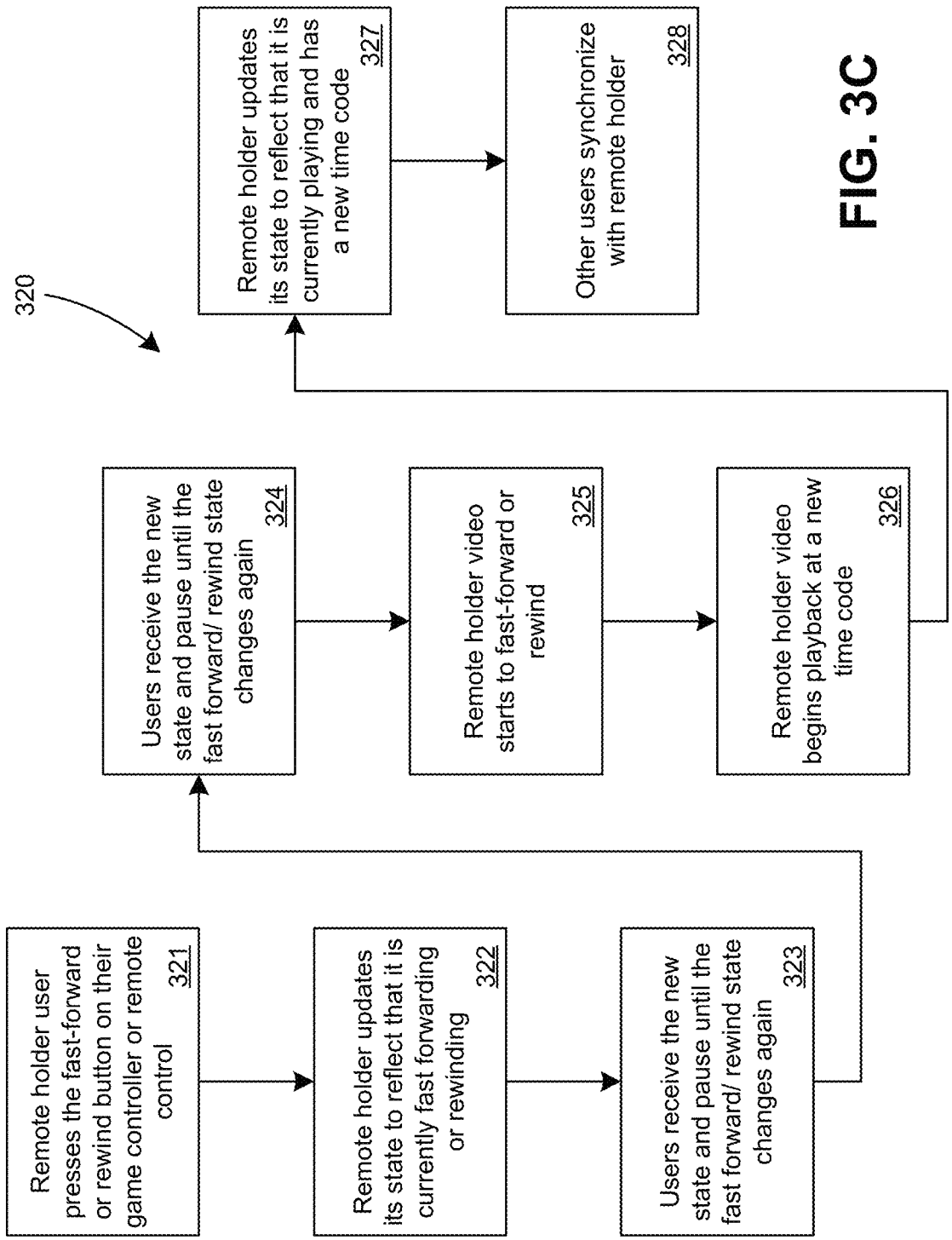

FIG. 3C is a flowchart of an example method 320 for synchronizing fast-forward and reverse commands from the remote holder. At 321, the remote holder may select a "fast-forward" or "reverse" operation, e.g., by pressing the fast-forward or reverse button on their game controller or remote control.

At 322, in response to the remote holder's selection of the fast-forward or reverse operation, the remote holder client may update its state to reflect that it is currently fast-forwarding or reversing. At 323, the remote holder client communicates the remote holder's state structure to the other clients in the party. At 324, the other users receive the new state, and pause until the fast forward/reverse state changes again.

At 325, the remote holder video starts to fast-forward or reverse. Eventually, the remote holder may select a "play" operation, e.g., by pressing the play button on their game controller or remote control. At 326, the remote holder video begins playback at the time code associated with the point in the video at which the remote holder selected the play operation.

At 327, the remote holder may update its state to reflect that it is currently playing and has a new time code, and communicate its state structure to the other clients in the party. At 328, the other users receive the new state structure and perform a seek and play operation to get back synchronized with the remote holder.

Thus, the remote holder may be allowed full control over the virtual remote control, while the other users have only the ability to exit the video experience, play, pause, and make requests of the remote holder. In an example embodiment, no playback changes are made until the remote holder has changed its own state.

Synchronization of avatars may be implemented in much the same way as described above in connection with synchronization of play and pause commands. Each user would construct his or her own avatar, or retrieve a saved avatar if the user already constructed one. Each client could then communicate information about its respective avatar to the other clients.

As each client renders its respective destination, it may retrieve the avatars from a common server (e.g., based on gamer tags associated with the avatars). For example, avatars may be retrieved via the interne. Avatar placement and emotion information may be contained in the state structure that is passed around the several users. Placement information may indicate where each avatar is to be presented in the user interface, either in absolute or relative terms. Emotion information may convey an emotional state. Each client may animate a certain avatar based on emotion information received for that avatar. Thus, when rendering its virtual destination, each client can determine from the state structure what the virtual destination is supposed to look like, avatar placement therein, which avatar is speaking, gesturing, leaving, etc.

Synchronized text chat may also be implemented in much the same way as described above in connection with synchronization of play and pause commands. Text provided by one user may be included in the state structure that is passed around the several users.

Voice chat can be implemented via the so-called "party" system, which connects up to eight or more users together. In essence, the party system employs a respective gamer tag associated with each of the several users. Thus, synchronized voice chat may be built into the system, eliminating any need to convey voice information in the state structure.

Figure 4:
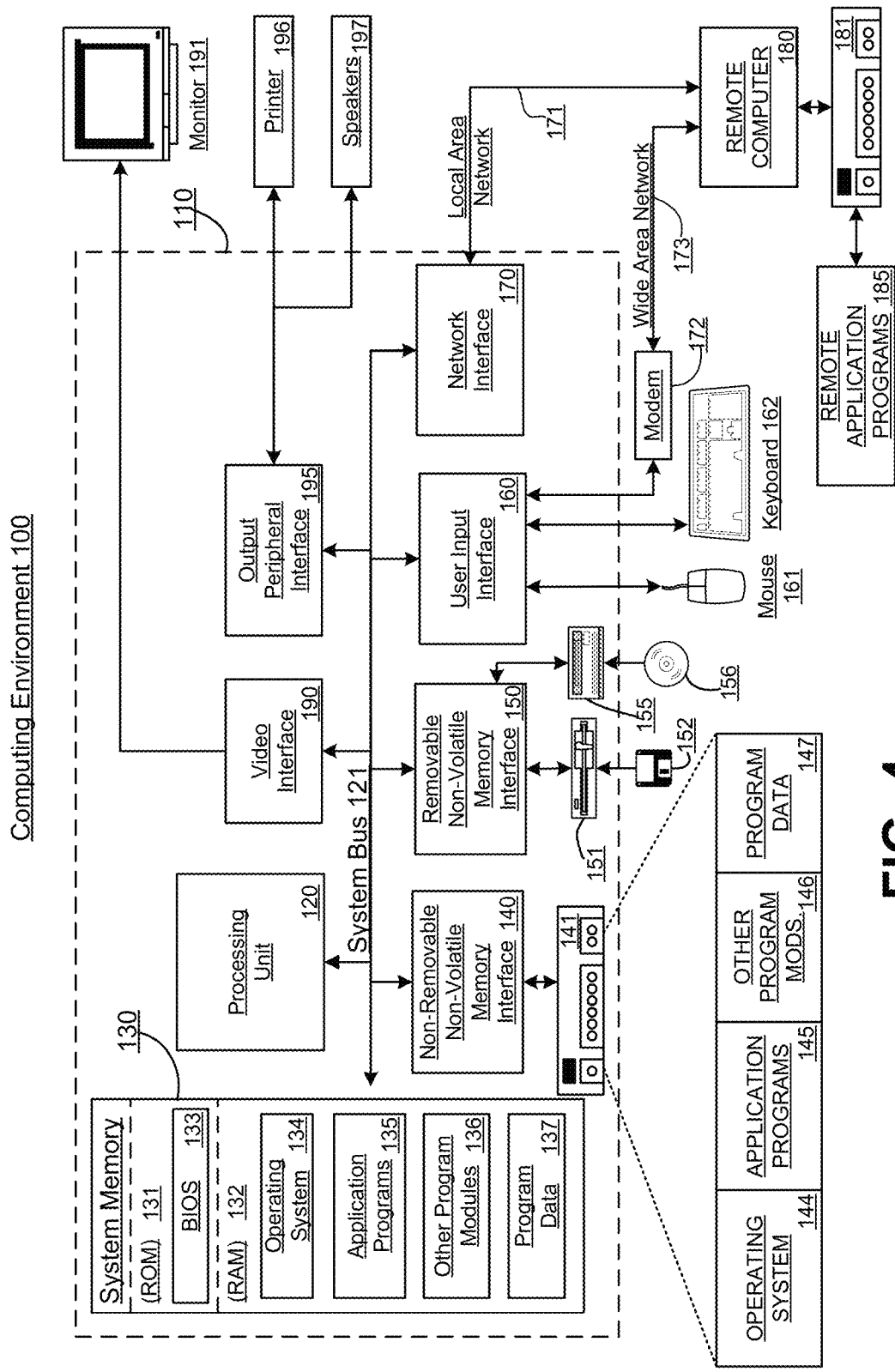
FIG. 4 is a block diagram of an example computing environment.

FIG. 4 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

Avatar Integrated Shared Media Nomination and Watching Experience

Described now is an exemplary embodiment illustrating some of the methods and systems disclosed herein for establishing and providing a shared media experience in a group comprising two or more users, each user operating a respective computing device and communicatively coupled via a network. A user may, at the user's location, use a multipurpose console that has access to an online network and network services. One service that may be available is an online media service that can provide streaming media services so that the user can experience near instant streaming of content.

In an embodiment, the user may desire to utilize a party mode on their console. A party may be a collection of users who may or may not all be interacting within the same experience at a given point in time. A party session may be established when party members interact with one another within the same application or experience.

Any user may host a shared video experience. In one embodiment, the user who initiates the party session may be deemed to be the party host. A host may invite other users to become members of a party and share a party experience. A host may create a shared party by either launching an application provided on the console that may provide or access an infrastructure for inviting party members to a shared media experience. Alternatively and optionally, the console may provide a wizard or guide for inviting other users to the party. Such applications may provide, for example, menus to select or enter the identities of other users who the host wishes to invite to the party. The application may transmit identifiers of the requested users to an online service that may in turn forward the requests to the identified users. The identified users may be notified via applications executing on their respective consoles that they have been invited to the party. The applications may then provide an interface for accepting or rejecting the invitation, upon which the application may return the acceptance or rejection to the online service. Finally, the online service may notify the host of the rejection or acceptance.

Once a party has been formed, a movie or television show may be selected by the party for shared viewing. One or more of the users may select one or more movies or shows to be listed in a watch queue. Such a queue may, for example, include a list of the movies and television shows that a user may want to watch via the online service. Typically, users may add titles to the queue using various means such as browsing on the online service website.

In one embodiment, the host of the party may be the only member of the party that is provided the capability to share out their watch queue to the other party members. The online service may make the information available so that the other party members may view the host's watch queue on their own consoles.

In another embodiment, any party member may be provided the capability to nominate content from within their own watch queues. The content nominations may be included and displayed in a party queue available to each party member. In one embodiment, each nominated movie or show may be represented in a two dimensional grid, for example a 3×3 tiled wall.

In addition, each party member may be provided the option to share their own personal queues with the entire party. Furthermore, even if the party member does not share their personal queues, they may still nominate content from their queues to the party queue. However, no other party members will see that party members queue.

Each party member's individual watch queue may be represented as a different channel or data stream on each user's display. When permitted, users may also browse the other users' watch queues and nominate the pieces of content that they wish to watch from the party member's queue. Users may also request and view details of each movie or show. For example, by selecting a particular movie in a user's queue, the details for the movie may be displayed, indicating for example the synopsis, run time, and other details of the movie.

After the users have nominated their choices, in a preferred embodiment the host of the session may select a specific movie or show for the entire party to watch. In other embodiments, the group or online system may determine the selected movie or show by determining the selection with the highest number of votes or other formulaic means.

In some cases one or more members of the party may not have audio capability and thus a visual confirmation may be provided when the host selects the movie. In an embodiment, the avatar of the party member who nominated the selected content may be displayed when the selected content item is highlighted in the party queue. This may provide a visual confirmation of the movie or show that was selected for viewing. Thus the party members may be made aware that the content has been selected and is ready to be viewed without relying on the need for voice communications within the party.

In an embodiment, the avatars may be used to convey emotions and feelings during the nomination and selection process. For example, a user may react to a movie nomination and desire to express the response to the other users. A user may wish to, for example, let others know what the user is thinking, provoke a response from other users, make a statement about the movie, or respond to another user's conveyed emotion.

Figure 6:
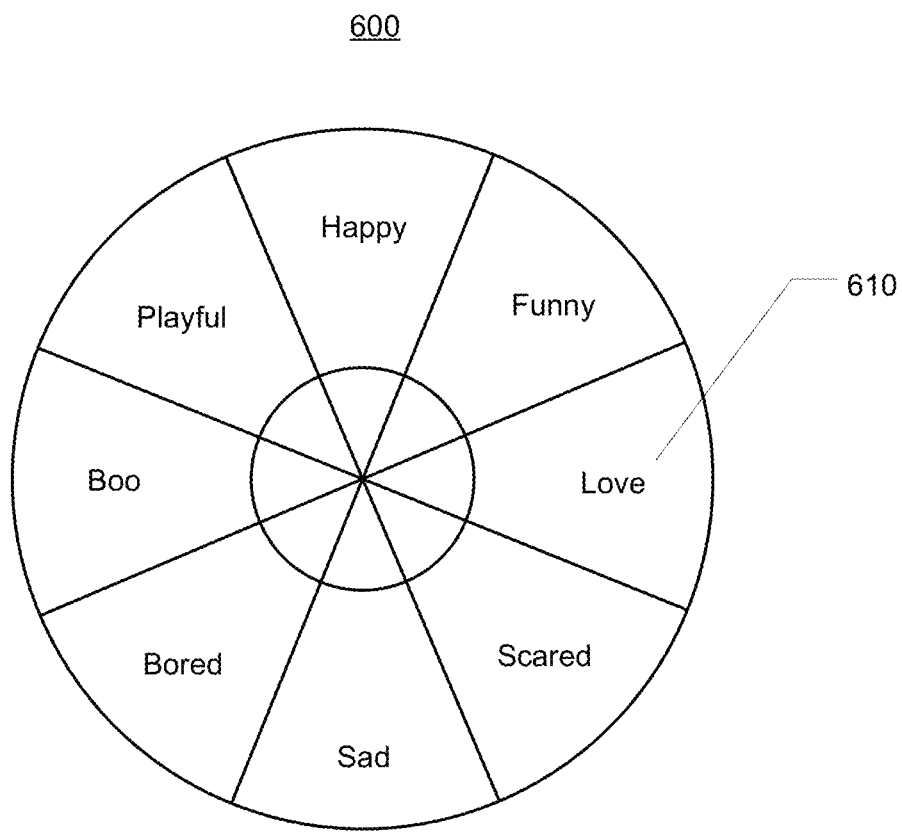
FIG. 6 depicts an exemplary user interface incorporating some of the embodiments disclosed herein.

Referring to FIG. 6, in one embodiment the input of emotions may be implemented using a fly out wheel displayed on the user's screen and activated using an appropriate control on the user's console, console accessory, or other input means. For example, the wheel can be activated and controlled using a gamepad or a remote controller.

Any number of emotions or responses may be provided on the fly out wheel. By way of example and not limitation, eight categories of emotions may be used as shown in FIG. 6.

In an embodiment, each category may be represented by one static avatar action or animation, or a series of animations selectable by the user. In other embodiments, rather than giving the user the ability to choose the details of the animation, a random predefined animation may be rendered once the user selects the emotion they want to convey. The categories of emotions may further be based on typical responses that users may have watching major film genres such as action, adventure, comedy, crime/gangster, drama, historical, horror, musicals, science fiction, war, westerns, and the like.

Based on the above listed genres and typical response associated with the genres, in one embodiment depicted in FIG. 6 the following categories may be used to populate an avatar emotion response function:
1. Love
2. Hate
3. Funny
4. Bored
5. Happy
6. Sad
7. Mischievous
8. Scared These specific emotions may also be referred to as emotes. In an embodiment, each category may further provide at least three random animations. Each avatar may also perform idle animations to make the experience more interesting for the users, even when an emotion has not been actively selected by the users.

Additionally and optionally, audio effects may also be provided. The audio effects may be combined with the on screen animations to further enhance the party experience. For example, a clapping audio clip may be rendered along with one of the selected emotions.

In various embodiments, additional features may be added to enhance the party experience. For example, the consecutive selection of three emotions may perform/unlock a special emote. Additionally, on certain days such as holidays, some emotes may be configured to behave differently than on other days/times. Finally, avatars may perform different animations depending on the user's profile. For example, female avatars may use different animations than male avatars.

In an embodiment, users may be given the option to turn off the avatar experience and not use emotes. Users may continue to communicate to other party members using a voice chat mode. In an embodiment, the user may still be able to communicate via the user's headset, but the user will no longer see the other user's avatars. In one embodiment, however, pop-up notifications (e.g., "User X is Happy") may still be presented during the group watching experience.

Once a movie or show has been selected, the users may be provided a display that shows a loading scene while buffering the content in preparation for playback. The display may also provide specific details such as "starting party," "buffering content," "waiting for party members," and the like. By providing such status information, each party member may be informed that a selection has been made and that playback will soon take place. Furthermore, the virtual experience may be enhanced by having the avatars take their seats in preparation for the movie to start. Animations such as those that depict each party member getting comfortable in front of the loading scene may be used to communicate the current status to the party members and enhance the enjoyment of the group experience.

FIGS. 5A-5K depict exemplary screen shots from the perspective of one user of a group of users illustrating the avatar integrated shared media nomination and watching experience disclosed herein. In this example, each user sits in his or her own physical location and views the display on his or her own computing device, such as an Xbox console. Each user's console may be connected via a network, such as the Internet. In one embodiment, each user is logged into a respective Xbox Live account.

Figure 5A:
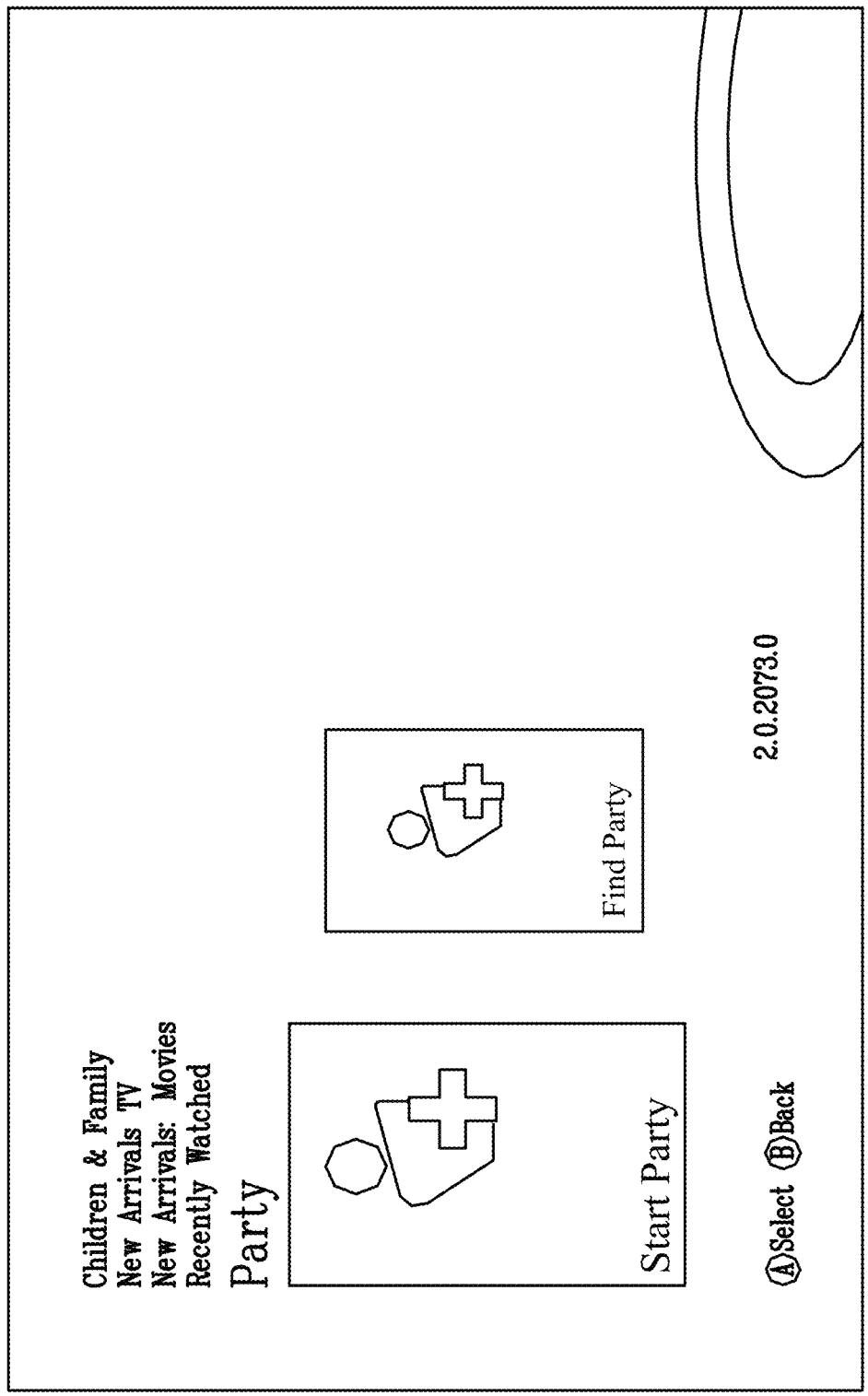
FIGS. 5A, 5B, 5C, 5D, 5E, 5F, 5G, 5H, 5I, 5J and 5K are screen shots from the perspective of one user of a group of users illustrating a process flow of an avatar integrated shared media nomination and watching experience.
Figure 5B:
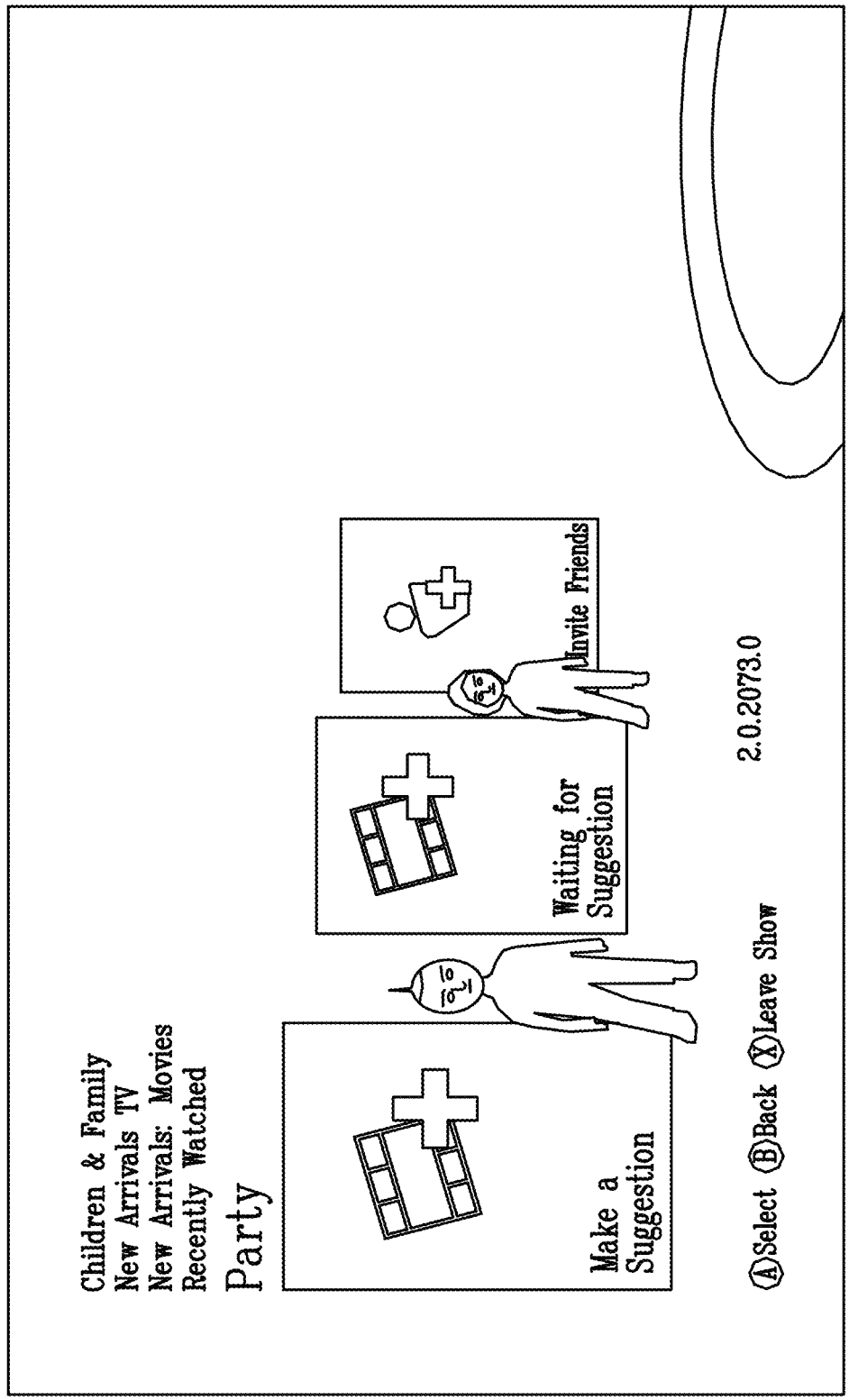

In one illustrative example of a nomination process, FIG. 5A depicts a starting screen that may be presented to one user showing a "Start Party" option that may be selected by the user to start a shared media nomination and watching experience. FIG. 5B depicts one exemplary screen in which a user may suggest a movie to watch, wait for a suggestion, or invite users to join the party.

Figure 5C:
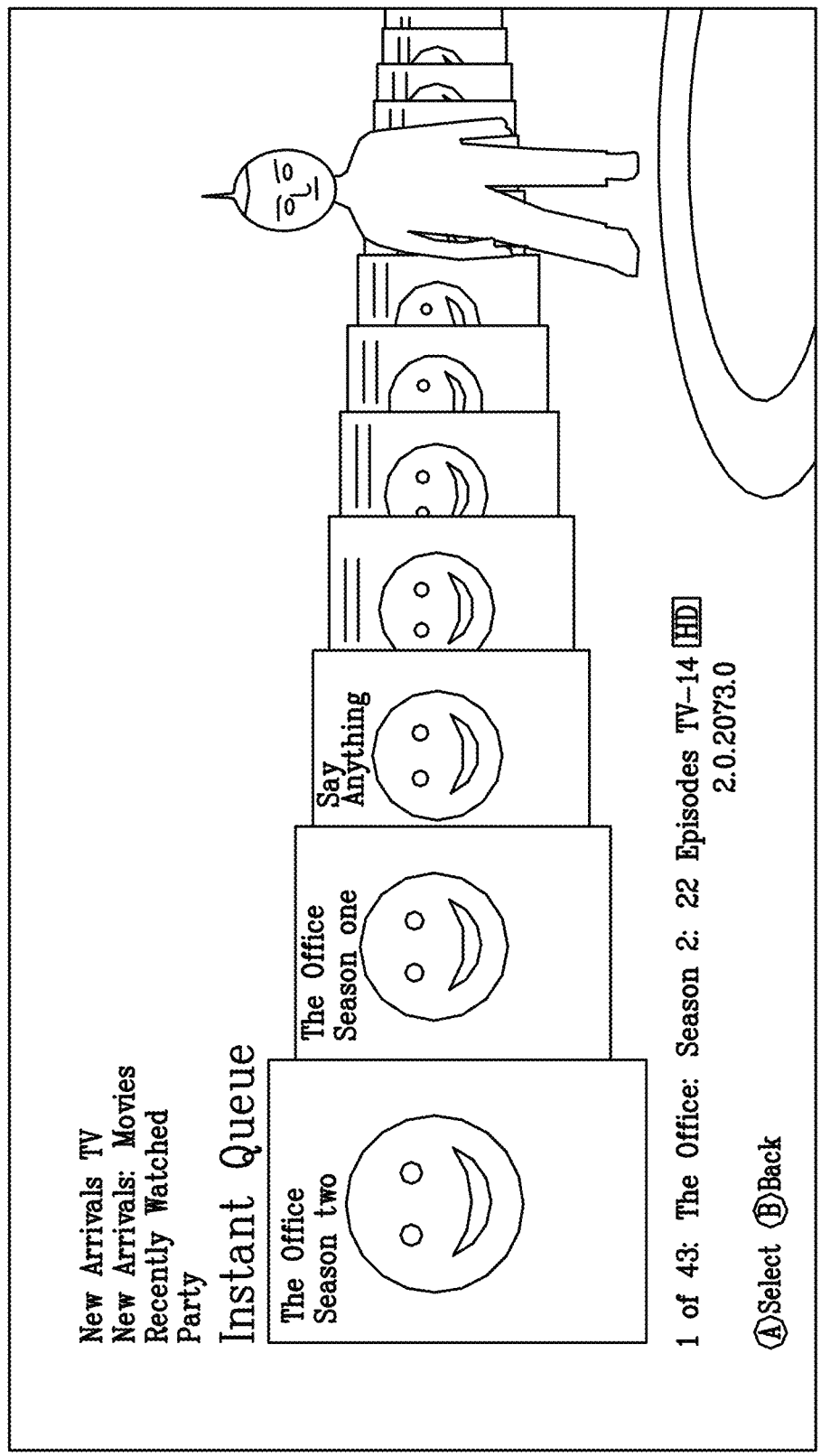

FIG. 5C depicts a user screen for nominating a selection. The user may be provided the option to browse a list of available content.

Figure 5D:
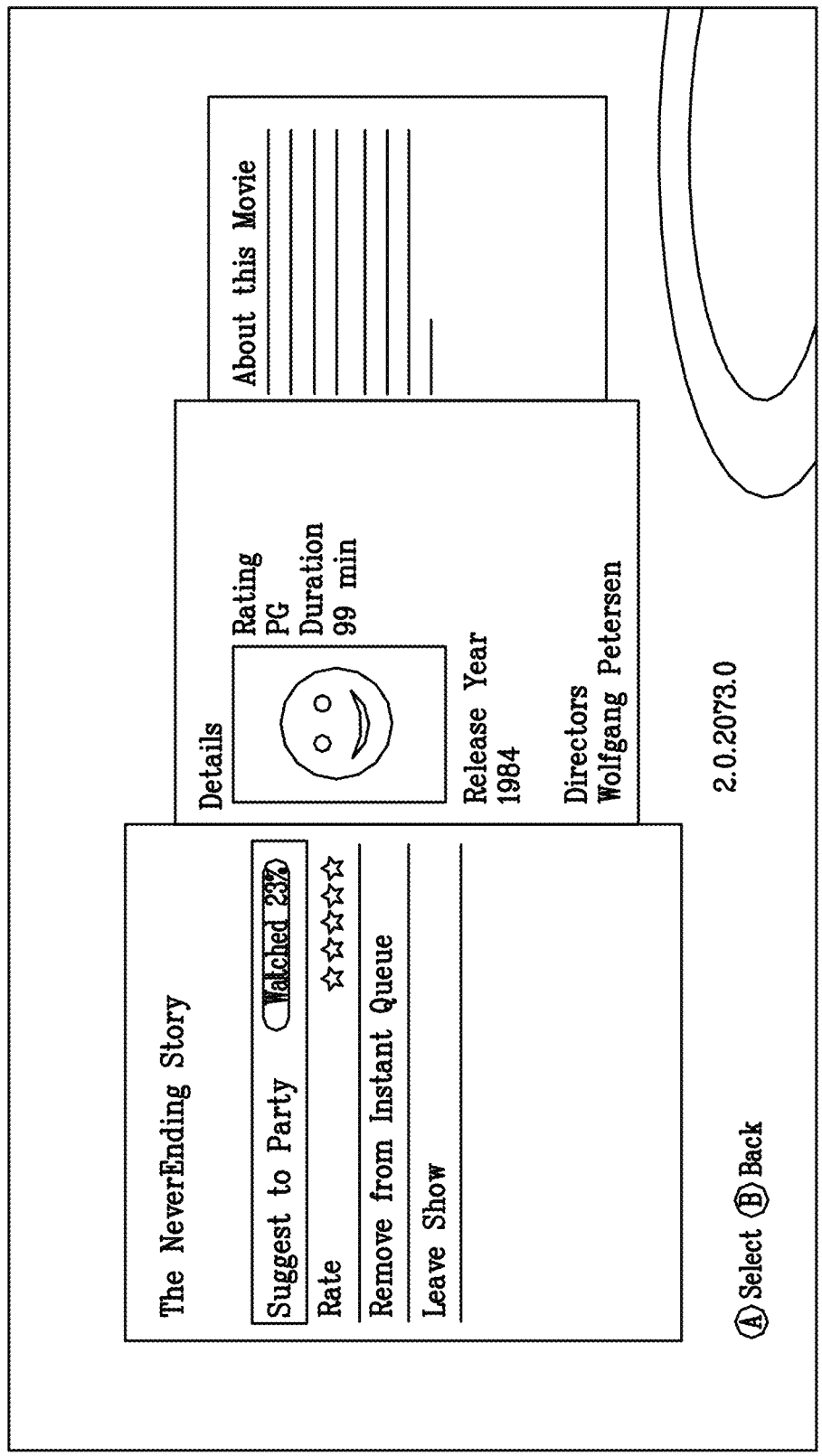

FIG. 5D depicts a user-interface screen presented to the user that allows the user to suggest to the other users participating in the "party" that the group view a selected piece of content ("The Neverending Story" in this example).

Figure 5E:
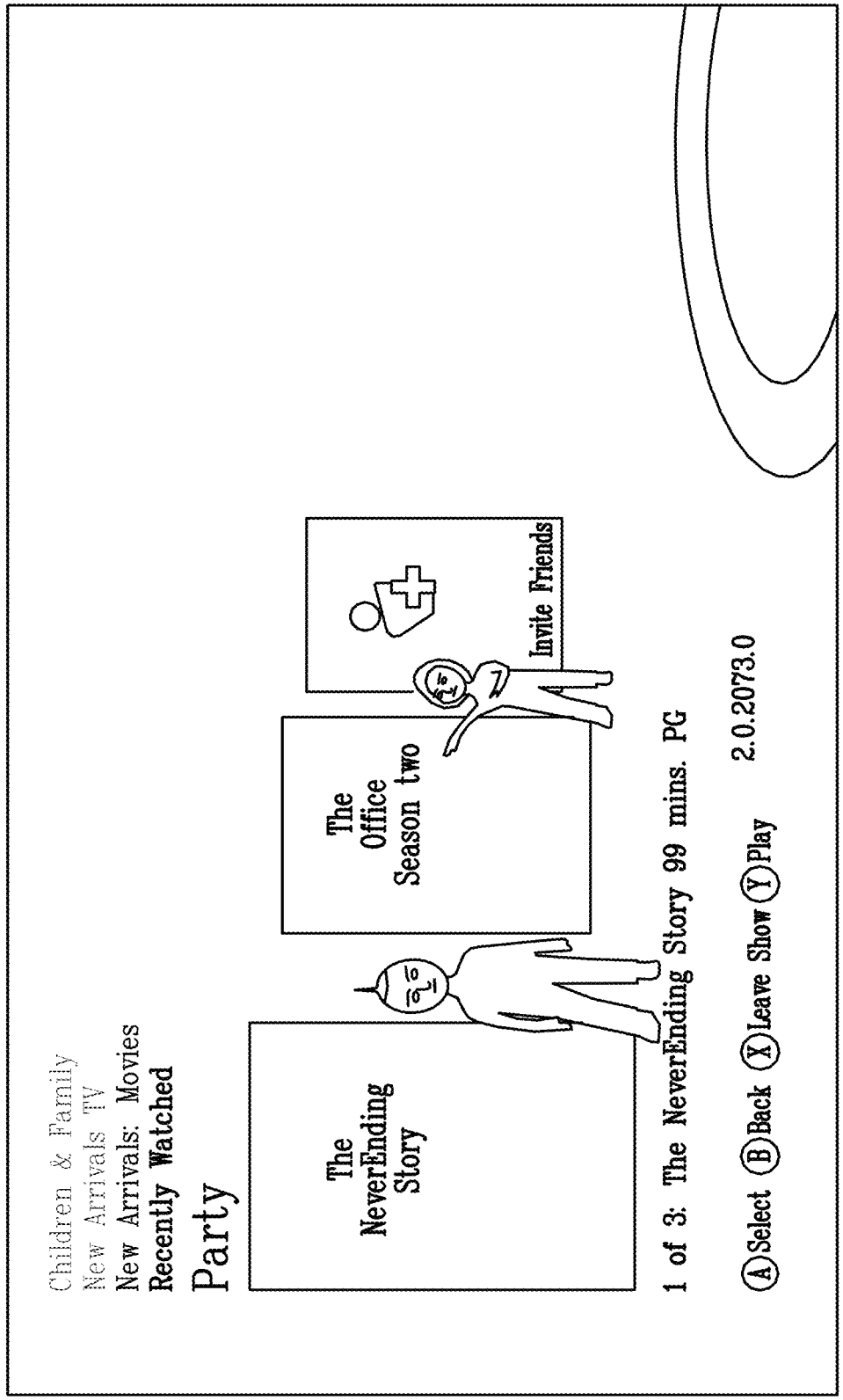

FIG. 5E depicts the user's interface after making the nomination. The figure also illustrates animation sequences of the other user's avatar that represent how strongly the other user feels about watching the other user's suggestion. With this feature, a user can lobby for his or her selection and reflect to the other users through that user's avatar how strongly the user feels about watching his or her selection. Animations may include the avatar pointing, waving hands, jumping, spinning or any other movement or expression.

Figure 5F:
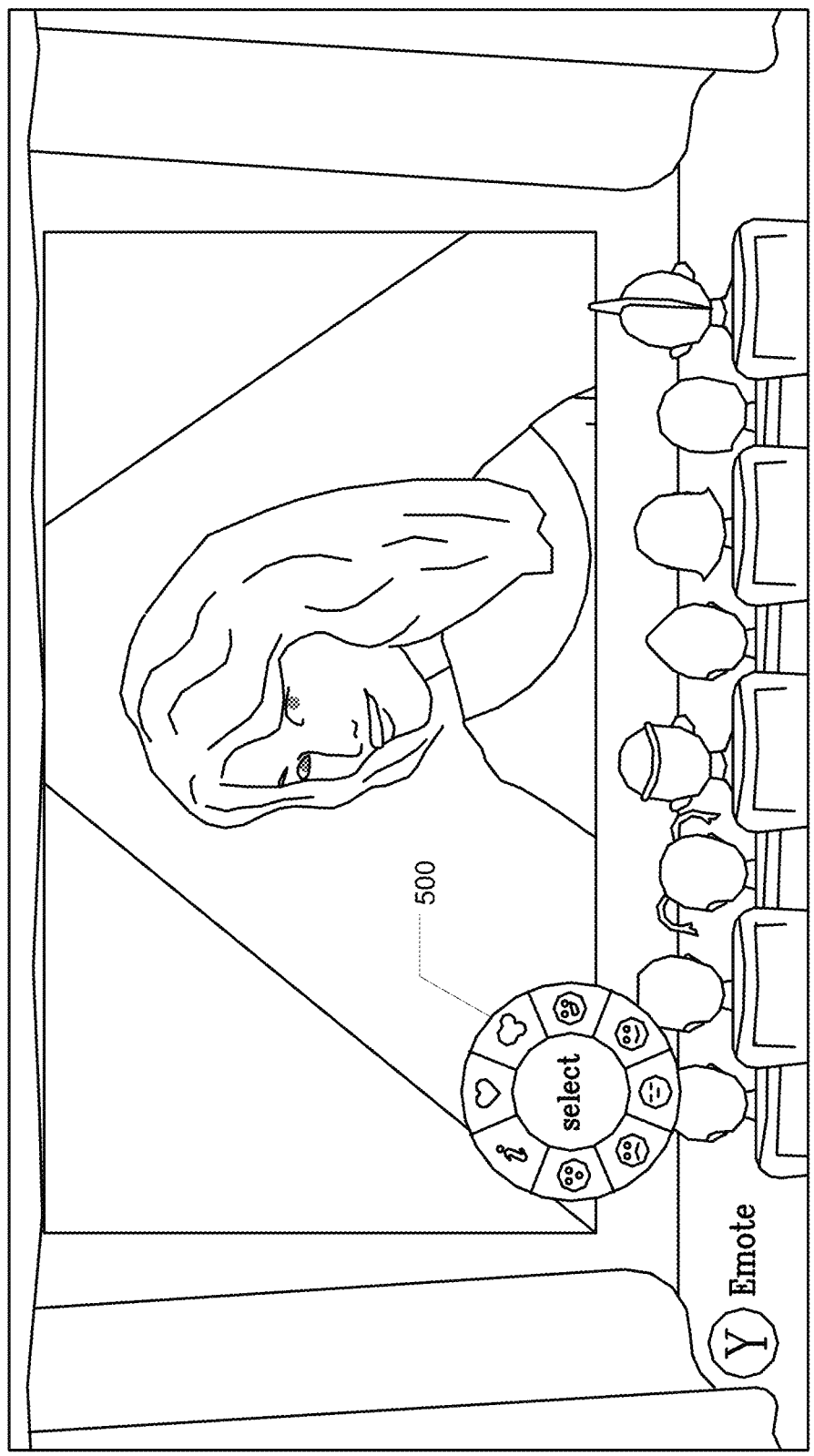

FIG. 5F shows one embodiment of a user-interface screen that is presented to each user. As shown, in this example, the screen resembles a home theater, and the avatars for each user are shown as if they are sitting together on a couch toward the bottom of the screen. In this example, the backs of the avatar's heads are visible. In some embodiments the avatars may be rendered as silhouettes as viewed from behind the avatars.

As discussed above, the avatars may be used to convey emotions and feelings during the viewing. For example, a user may react to a scene in the movie or show and desire to express the response to the other users. A user may, for example, let others know what the user is thinking, provoke a response from other users, make a statement about the movie, or respond to another user's conveyed emotion. When the animations are performed, an avatar may turn around and perform the animation so that the users can view the animations from a frontal perspective.

FIG. 6 shows one example of a selection mechanism (a wheel or circle in this example) that is presented to a user to allow the user to select one or more "emotions" to be reflected through that user's avatar in order to display emotions to the other users participating in the group watching experience. Because the users are not physically at the same location, they cannot see each other; only each other's avatars. And although the users may be able to "chat" during the presentation of the content via their respective headsets, the visual element of emoting would otherwise be missing. With this mechanism, a user can cause the user's avatar to perform an animation that expressed to the other users how the user is feeling during the watching experience.

Figure 5G:
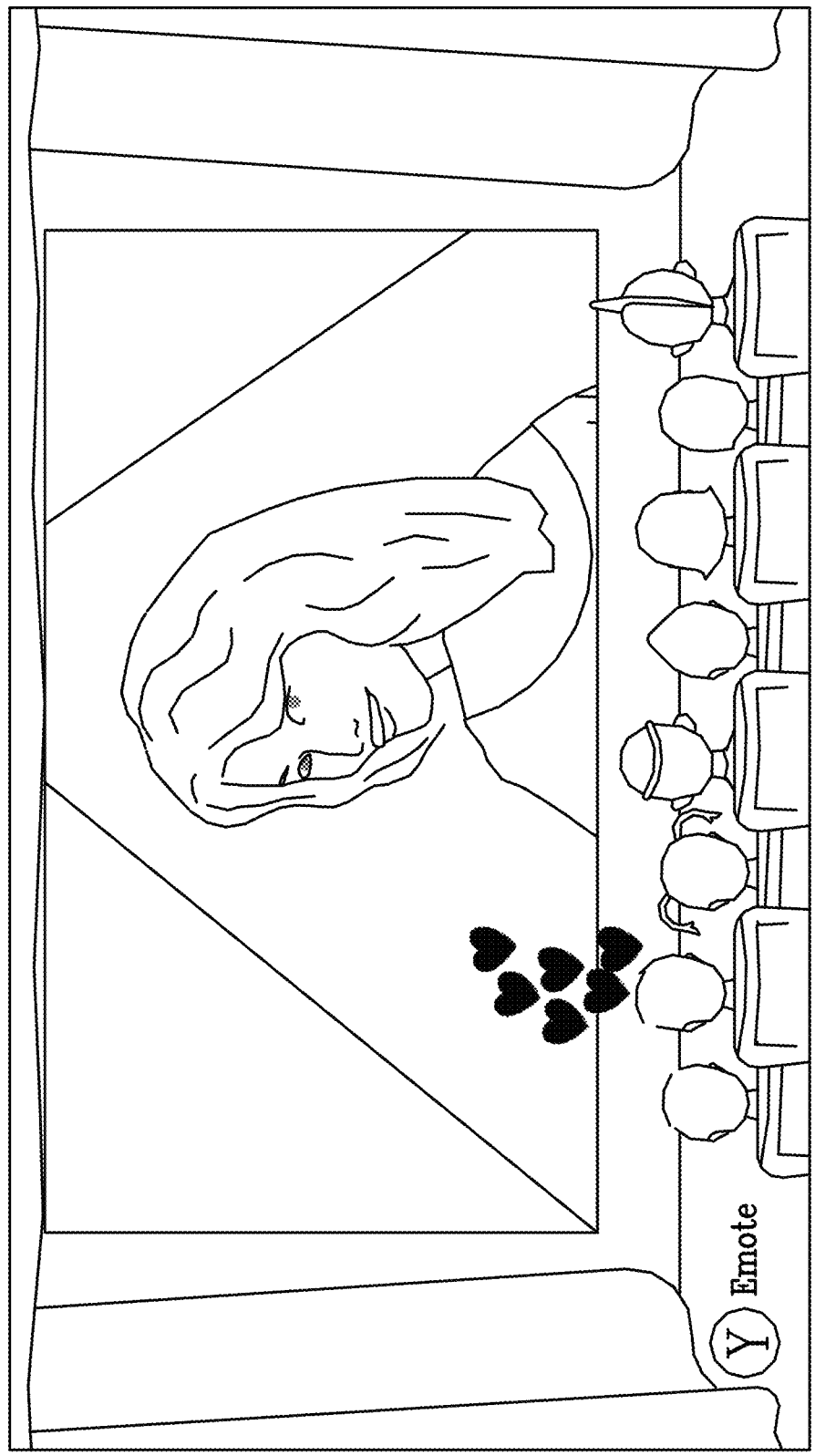

For example, if a user selects the "love" emote 610, an avatar may make a sighing gesture and animated hearts may appear above the avatar's head, as shown in FIG. 5G, to indicate to the other users that this user "loves" the particular content or scene being viewed. Another selection may make the avatar appear to be laughing to indicate that the user finds the content funny. Some animations may be used to enhance the playfulness of a group experience. For example, an animation may show an avatar throwing popcorn. Such animations may help create an irreverent and playful feel of the experience.

Referring back to FIG. 5F, an example emote wheel 500 is depicted that illustrates one implementation of an emote wheel using icons instead of text. The emote wheel 500 may be continuously present on the display, or may be rendered on the display when requested by the user, for example when a control button on the console is pressed.

Figure 5H:
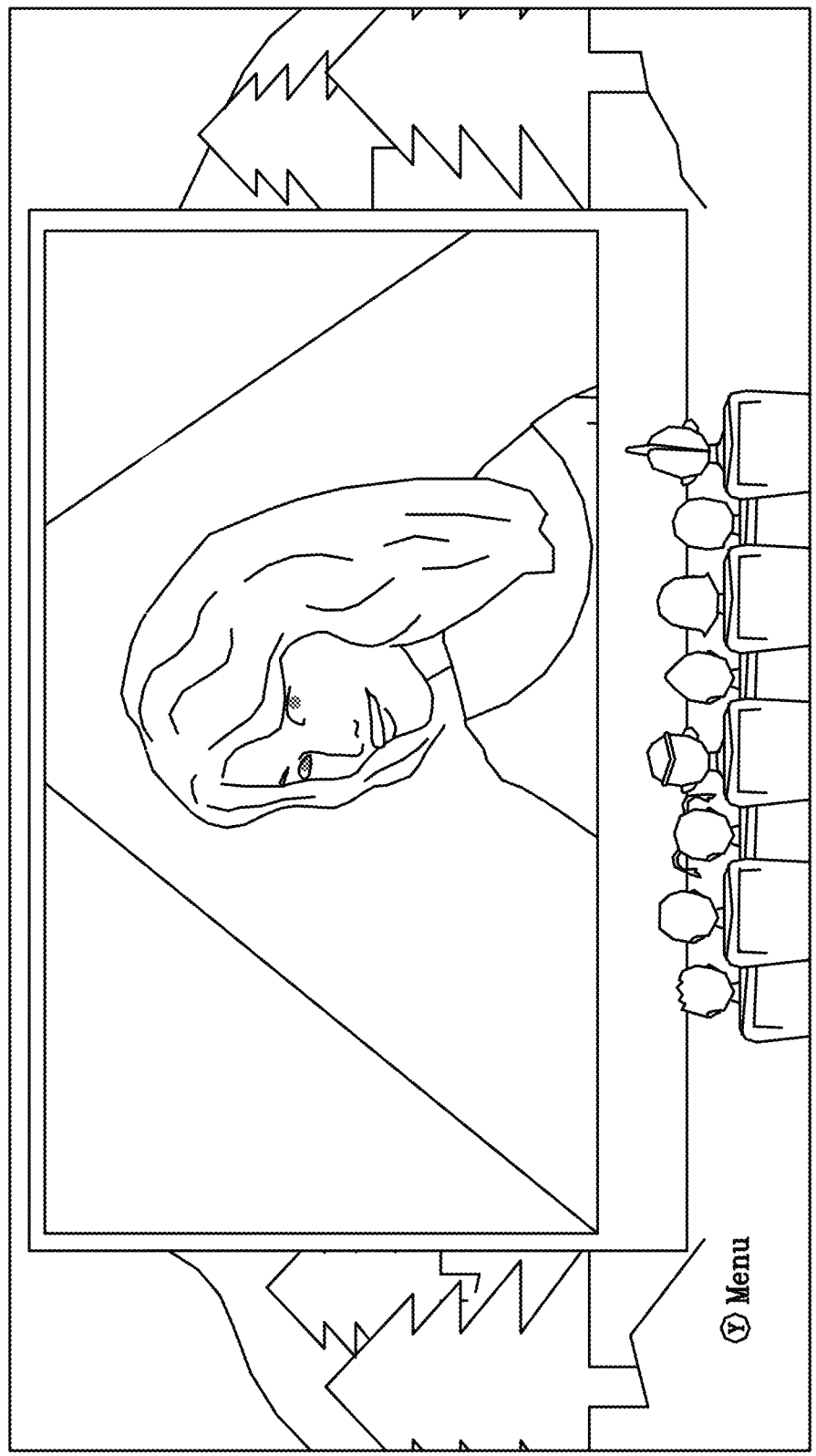
Figure 5I:
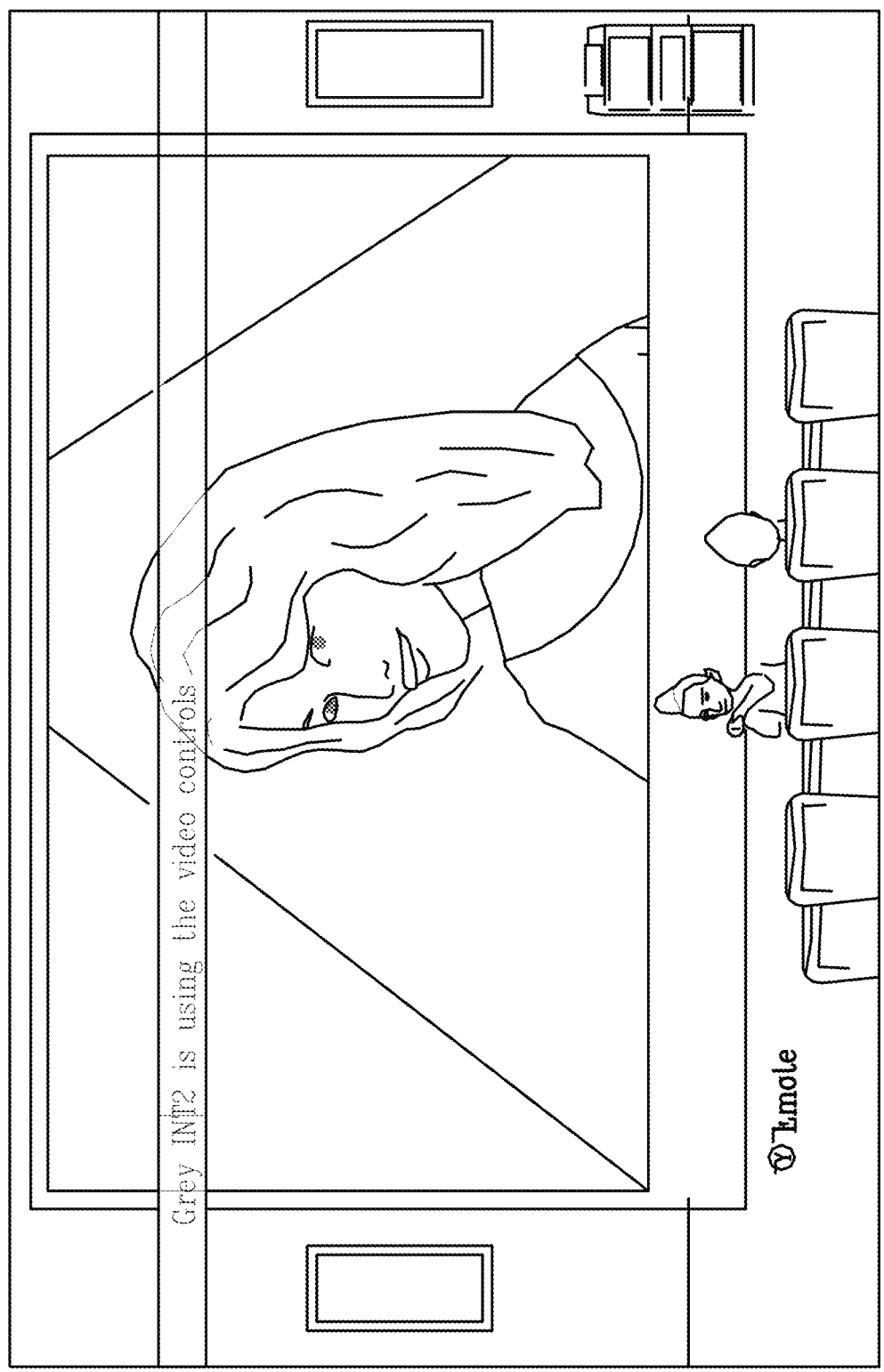

As mentioned above, different themes, brands, or destinations can be applied to the watching experience. Conceptually, the leader can take his or her group of users to watch a movie or show to a variety of destinations around the world. As shown in FIG. 5F, for example, the leader may "take" the other users to a traditional move theater. In the example shown in previous figures, the theme is that of a home theater. In addition to user selectable themes, other themes may appear based on events that are occurring for the user. For example, when the groups of users are viewing a movie during the winter months, a "Winter Wonderland" theme may be available (as shown in FIG. 5H). As another example, a special theme (not shown) may be available when it is your birthday.

In various embodiments, a button or other selection mechanism may be available on the user interface screen that signifies themes that may be selectable. In one embodiment, only the leader may have the selection feature mechanism enabled. In other embodiments, other users may also have the mechanism enabled. When the leader cycles through different themes, then all members of the party may receive indication of the themes and render the themes unless the user has switched to full screen mode. When a user is in full screen mode and then switches back to avatar rendering mode, then the user's interface may render the theme chosen by the leader.

As mentioned above, some themes may be made available based on certain conditions, such as a time of the year or a date of importance to a user such as a user's birthday. When the parameters of such a condition are satisfied, then that theme may be chosen by default until the condition is no longer met and the theme may then no longer be available (until the condition occurs again). When a special theme is unhidden, the leader may still have the ability to change to a different theme. The unhidden theme may just be a new option in the list. As an example, for a Birthday Theme, the conditional may be that if any member of a watching party has a birthday of today, within three days in the future or within three days in the past, the default theme may be the Birthday Theme and the theme may then be unhidden in the list of themes. As another example, the condition for a Winter Wonderland Theme may be that during the month of December every year, the Winter Wonderland Theme may become the default and be unhidden in the list of themes.

Figure 5J:
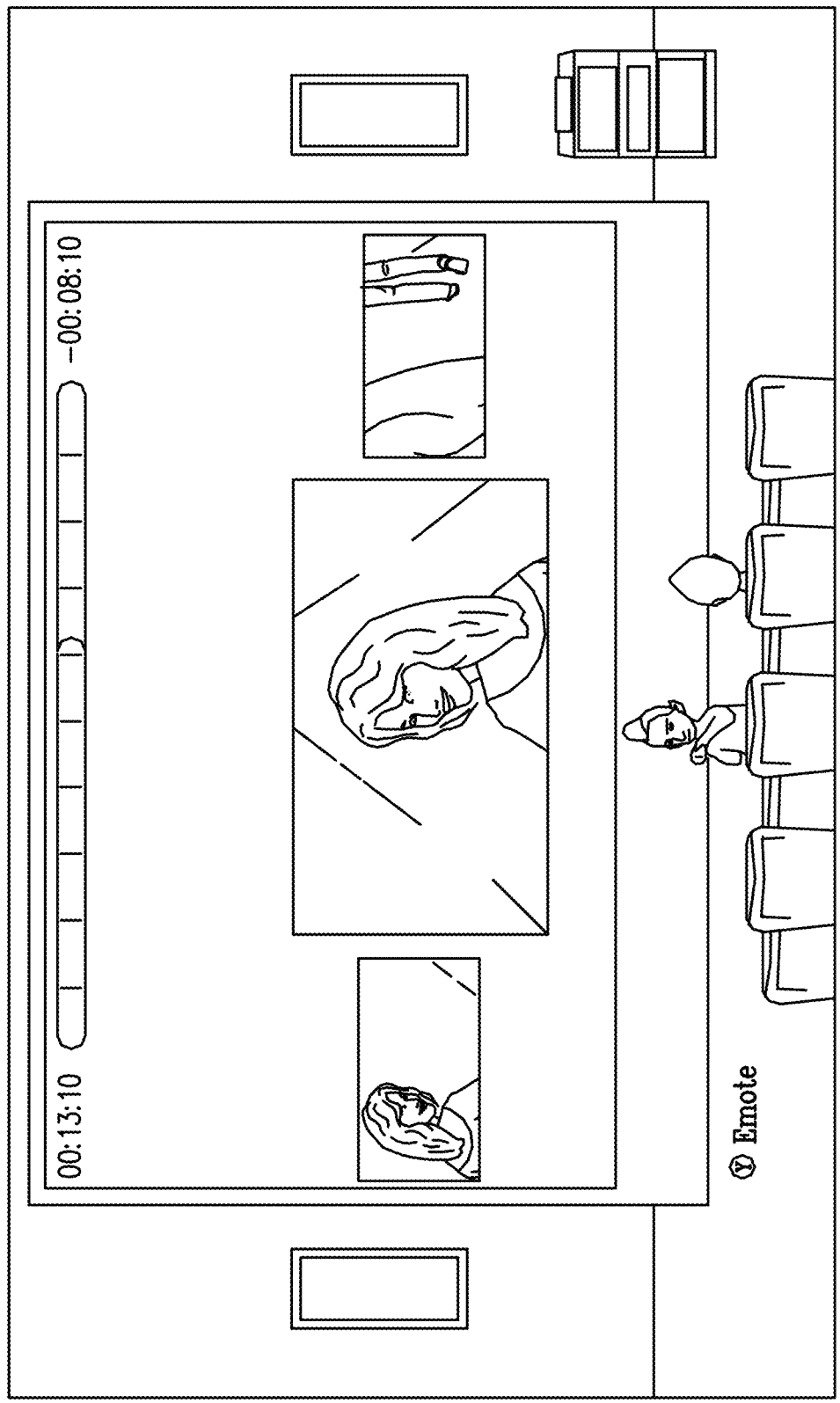
Figure 5K:
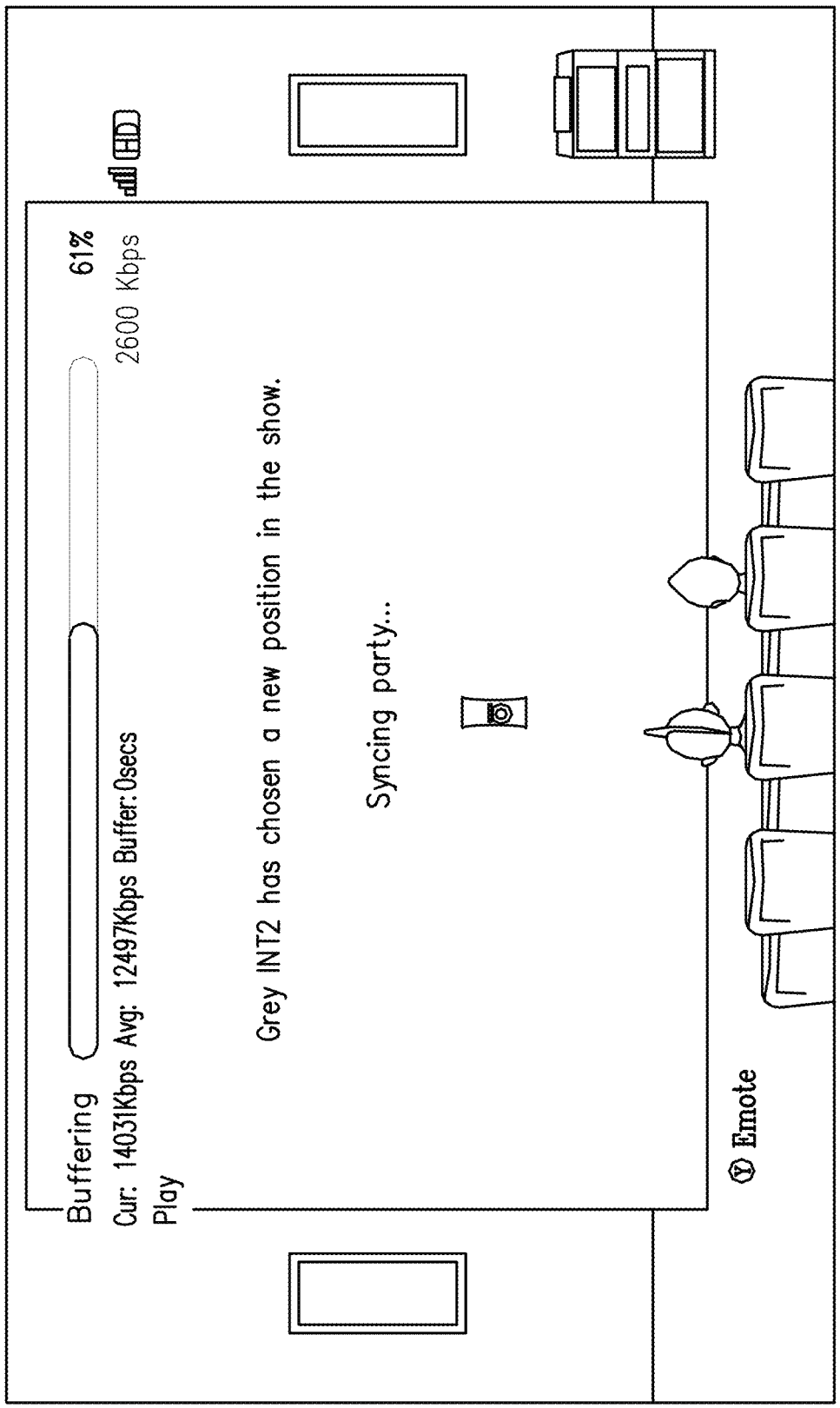

In one embodiment, the leader may be provided the ability to chapter skip, fast forward, rewind, and pause. Once the leader chooses such a "trick mode," the displays for the other users may show the video freezing. Text may be displayed indicating that the leader is finding a new position to position the video. FIG. SI depicts the leader's avatar making a "time-out" gesture when the leader selects a particular trick mode. The screen may also indicate, as shown, that the host is using the video controls and that the user may expect a change in the rendered display. FIG. 5J depicts the leader's user-interface as the leader "fast forwards" through the content to select a new position in the content. FIG. 5K depicts a user interface screen that may be presented to the users in the group after the leader has selected a new position from which viewing is to be resumed. As shown, each user's console may indicate that the console is buffering and synchronizing to the new viewing position.

Figure 7:
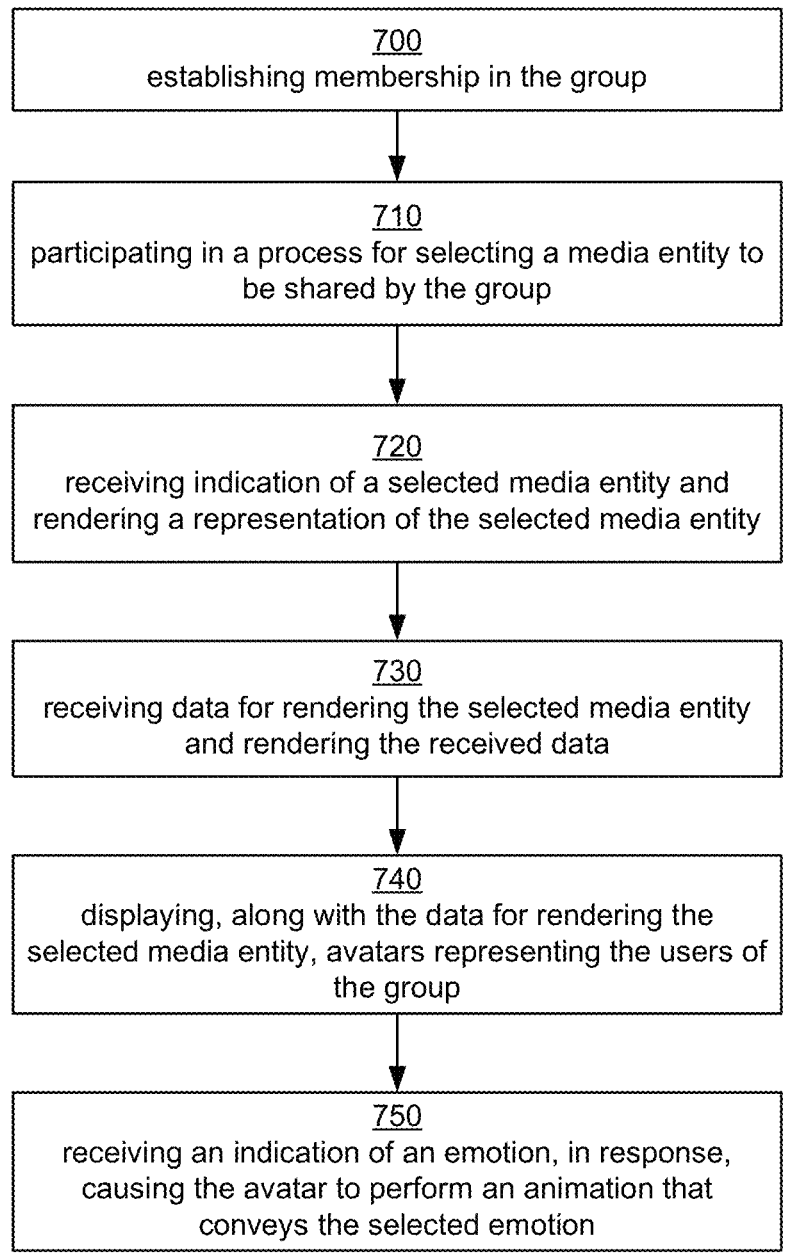
FIG. 7 depicts an exemplary process incorporating some of the embodiments disclosed herein.

Referring now to FIG. 7, illustrated is an exemplary process for providing a shared media experience in a group comprising two or more users, each user operating a respective computing device and communicatively coupled via a network, including operations 700, 710, 720, 730, 740, 750, and 760. The illustrated operations are exemplary and do not imply a particular order. Process 700 illustrates establishing membership in the group.

Process 710 illustrates participating in a process for selecting a media entity to be shared by the group. Such a process may include, for example, receiving, on one of the computing devices, a request to join the group; sending the input to a shared media service provider and receiving an indication of acceptance into the group; receiving data describing media entities selected by other members of the group and rendering representations of the received media entities on a user interface device coupled to the respective computing device; receiving a nomination identifying one of the media entities and sending the nomination to the shared media service provider; displaying on the user interface device, along with the representations of the received media entities, avatars representing the users of the group; receiving an indication of an emotion from the one of the users and, in response, causing the avatar for said one of the users to perform an animation on the user interface device that conveys the selected emotion; sending the selection of the emotion to the shared media service provider for sending to the other users of the group; and receiving an indication of a selected media entity to be shared by the group and displaying a representation of the selected media entity on the user interface device, wherein the selected media object is selected by one of the users of the group deemed to be a host of the group.

Process 720 illustrates receiving indication of a selected media entity to be shared by the group and rendering a representation of the selected media entity on one of the computing devices.

Process 730 illustrates receiving data for rendering the selected media entity and rendering the received data on a user interface device coupled to said one of the computing devices.

Process 740 illustrates displaying on said user interface device, along with the data for rendering the selected media entity, avatars representing the users of the group, the avatars rendered so as to depict a shared media experience. As noted above, the selected media entity may be a movie and said rendering the received data may further comprise rendering a simulated viewing environment and rendering the avatars such that the avatars appear to be sitting in a group seating environment and viewing the movie on a screen. In one embodiment, the simulated viewing environment may be selectable from a predetermined list of themes. Furthermore, an option may be provided to view the movie in a full view mode wherein the simulated viewing environment and rendering of the avatars is hidden from view.

Process 750 illustrates receiving an indication of an emotion from one of the users and, in response, causing the avatar corresponding to said one of the users to perform an animation on said user interface device that conveys the indicated emotion. In an embodiment, the emotion is selected from an emote wheel comprising a plurality of representative emotions. The emote wheel may be divided into pie shaped segments radiating from a center of the emote wheel and each of the representative emotions may be represented as one of the pie shaped segments. In an embodiment, a random animation may be displayed based on the selected emotion.

As noted above, the representative emotions may be selected based on film genres. For example, the emotions comprise love, hate, funny, bored, happy, sad, mischievous, and scared. In an embodiment, the random animation may comprise one of: at ease, cheer, disappointed, dance, looking, nervous, neutral, surprised, taunt, thinking, and walk.

In an embodiment, input means may be provided for said one of the users to provide an input indicating a request to pause the rendering of the media entity. Furthermore, input means may also be provided for said one of the users to provide an input to indicating a request to fast forward or rewind the rendering of the media entity.

Input means may also be provided for said one of the users to provide an input to indicating a request to render a predefined audio effect during the rendering of the media entity, wherein the audio effect corresponds to one of the representative emotions.

Figure 8:
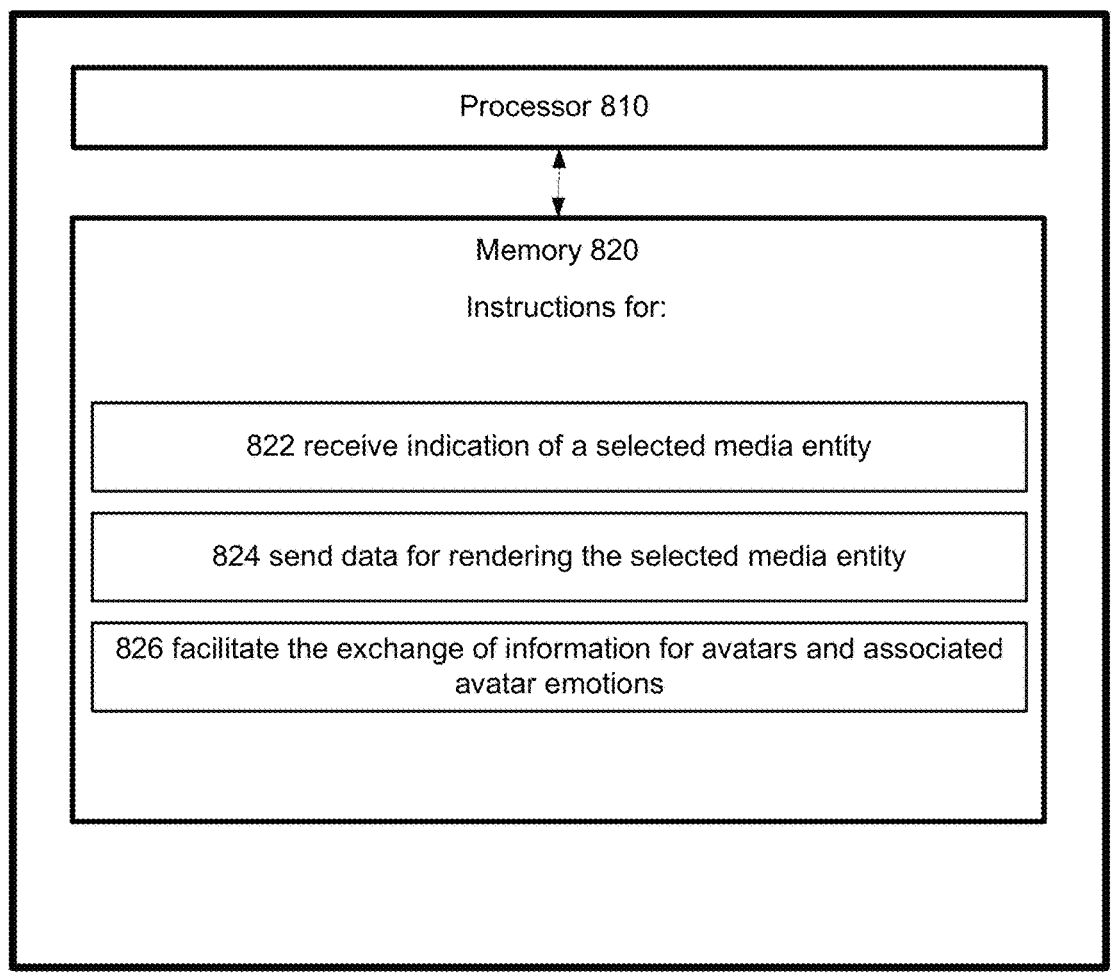
FIG. 8 depicts example system for providing a shared media experience.

FIG. 8 depicts an exemplary system for providing a shared media experience in a group comprising two or more users, each user operating a respective computing device and communicatively coupled via a network. Referring to FIG. 8, system 800 comprises a process 810 and memory 820. Memory 820 further comprises computer instructions for establishing a shared media experience in a group comprising two or more users, each user operating a respective computing device and communicatively coupled via a network.

Block 822 illustrates instructions for receiving indication of a selected media entity to be shared by the group. Block 824 illustrates instructions for sending data for rendering the selected media entity on a user interface device coupled to the respective computing device.

Block 826 illustrates facilitating the exchange of information for avatars and associated avatar emotions, the avatars representing the users of the group and the avatar emotions comprising indications of emotions selected by the one or more users, the avatar emotion information sufficient to allow one of the computing devices to render an animation that conveys the indicated emotion for an associated avatar.

Figure 9:
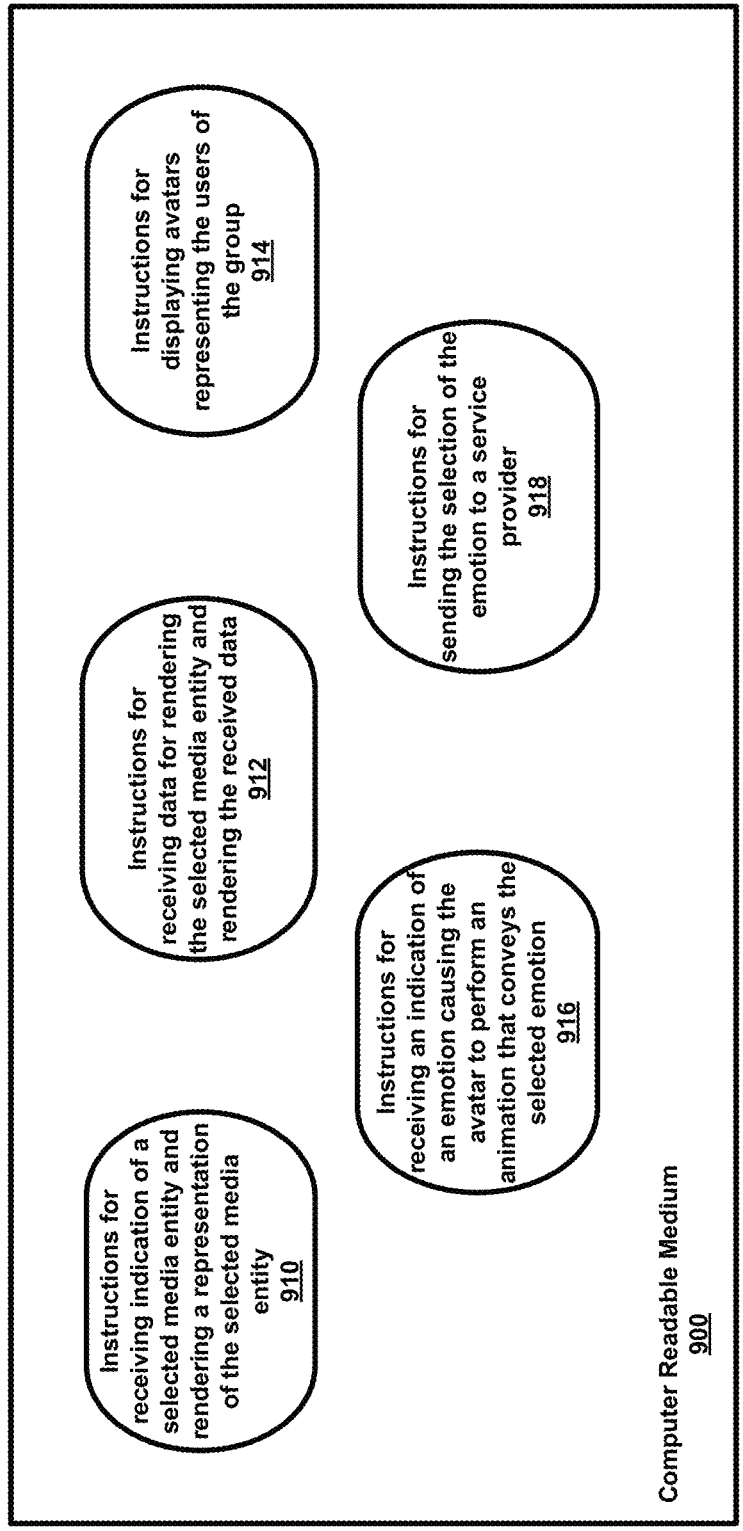
FIG. 9 illustrates a computer readable medium bearing computer executable instructions discussed with respect to FIGS. 1-8.

Any of the above mentioned aspects can be implemented in methods, systems, computer readable media, or any type of manufacture. For example, per FIG. 9, a computer readable medium can store thereon computer executable instructions for providing a shared media experience in a group comprising two or more users, each user operating a respective computing device and communicatively coupled via a network. Such media can comprise a first subset of instructions for receiving indication of a selected media entity to be shared by the group and rendering a representation of the selected media entity on said one of the computing devices 910; a second subset of instructions for receiving data for rendering the selected media entity and rendering the received data on a user interface device coupled to the respective computing device 912; a third subset of instructions for displaying on said user interface device, along with the data for rendering the selected media entity, avatars representing the users of the group, the avatars rendered so as to depict a shared media experience 914; a fourth subset of instructions for receiving an indication of an emotion from said one of the users and, in response, causing the avatar for said one of the users to perform an animation on said user interface device that conveys the selected emotion 916; and a fifth subset of instructions for sending the selection of the emotion to a service provider for sending to the other users of the group 918. It will be appreciated by those skilled in the art that additional sets of instructions can be used to capture the various other aspects disclosed herein, and that the presently disclosed subsets of instructions can vary in detail per the present disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:

1. A method for facilitating shared media consumption among two or more users associated with respective computing devices communicatively coupled via a network, the method comprising:
   receiving data indicative of two or more users associated with respective computing devices;
   receiving a selection of a media content item to be concurrently rendered on the respective computing devices;
   sending, to the respective computing devices of the two or more users, data of the media content item selected;

allowing an identified remote holder of the two or more users to send information pertaining to content playback of the media content item selected, the information comprising playback status, identification of the media content item, and a current time code associated with the media content item;

based on the information, allowing control of content playback on the respective computing devices of other users of the two or more users based at least in part on differences in the information pertaining to the content playback between the respective computing devices;

receiving a request from another user other than the identified remote holder requesting for remote holder status;

in response to receiving the request, allowing the identified remote holder to select to retain the remote holder status or transfer the remote holder status to the other user; and when the identified remote holder selects to transfer the remote holder status, then facilitating the transfer of the remote holder status to the other user to allow the other user to obtain the control of the content playback.

2. The method of claim 1, further comprising allowing the identified remote holder to send updated information pertaining to content playback of the media content item, wherein in response to the updated information, content playback on the respective computing devices of the other users is controlled in accordance with the updated information.

3. The method of claim 1, wherein the control of the content playback comprises one or more of pause, play, rewind, and fast forward.

4. The method of claim 3, wherein the other users are allowed to request to play, pause, and obtain remote holder status by sending their respective states to the identified remote holder.

5. The method of claim 1, wherein the information pertaining to the content playback is maintained as a playback state that is synchronized among the respective computing devices of the two or more users.

6. The method of claim 5, wherein the playback state is saved in a data structure that contains information on the playback status, an identifier associated with the media content item being rendered, and the current time code associated with the media content item.

7. The method of claim 6, wherein when a playback state of the identified remote holder is different from a playback state of one other user, the playback state of the one other user is updated in accordance with the playback state of the identified remote holder.

8. The method of claim 7, wherein when the current time code associated with the media content item is different from a time code of the identified remote holder, a seek operation is performed to the time code of the identified remote holder.

9. The method of claim 8, wherein the one other user predicts, based on pre-buffering times, how long it will take the seek operation to complete, and compensates by adjusting a sought time code.

10. The method of claim 1, further comprising allowing one of the other users to make requests of the identified remote holder by sending the identified remote holder and the other users a playback state that differs from a playback state of the identified remote holder, and after receiving the request from the one of the other users other than the identified remote holder requesting for the remote holder status, sending a request to the identified remote holder requesting transfer of the remote holder status to the one of the other users.

11. A first computing device configured to share digital content with other computing devices communicatively coupled via a network, the first computing device comprising at least one processor, a user interface device, and at least one memory communicatively coupled to said at least one processor, the at least one memory having stored therein computer-executable instructions that, when executed by said at least one processor, cause the first computing device to:

receive, via the user interface device, a selection of at least one user associated with a second computing device;

send, to the second computing device, data indicative of a media content item to be concurrently rendered on the first computing device and the second computing device;

send, to the second computing device, information pertaining to content playback of the media content item, the information usable to allow control of content playback on the first computing device and the second computing device, the information comprising playback status, identification of the media content item, and a current time code associated with the media content item;

based on the information, allow control of content playback on the second computing device in accordance with the information based at least in part on differences in the information pertaining to the content playback between the first computing device and the second computing device;

receive, from the second computing device, a request for remote holder status; and in response to receiving the request, allow a selection of whether to retain the remote holder status to retain the control of the content playback or transfer the remote holder status to the second computing device to allow the second computing device to obtain the control of content playback.

12. The first computing device of claim 11, wherein the control of the content playback comprises one or more of pause, play, rewind, and fast forward.

13. The first computing device of claim 11, wherein the information pertaining to content playback is maintained as a playback state that is synchronized between the first computing device and the second computing device.

14. The first computing device of claim 13, wherein the playback state is saved in a data structure that contains information on the playback status, an identifier associated with the media content item being rendered, and the current time code associated with the media content item.

15. The first computing device of claim 14, wherein when a playback state of the second computing device is different from a playback state of the first computing device, the playback state of the second computing device is updated in accordance with the playback state of the first computing device.

16. The first computing device of claim 15, wherein when the current time code associated with the media content item is different from a time code of the first computing device, a seek operation is performed to the time code of the first computing device.

17. The first computing device of claim 14, further comprising allowing the second computing device to make requests of the first computing device by sending the first computing device a playback state that differs from the playback state of the first computing device.

18. The first computing device of claim 11, further comprising computer-executable instructions that, when executed by said at least one processor, cause the first computing device to receive playback state information from the second computing device, wherein the second computing device is allowed to request to play, pause, and obtain remote holder status by sending the playback state information.

19. A system configured to allow sharing of digital content among computing devices communicatively coupled via a network, the system comprising at least one processor and at least one memory communicatively coupled to said at least one processor, the at least one memory having stored therein computer-executable instructions that, when executed by said at least one processor, cause the system to:
- receive data indicative of two or more users associated with respective computing devices;
- receive a selection of a media content item to be concurrently rendered on the respective computing devices;
- send, to the two or more users, data indicative of the media content item selected;
- allow an identified remote holder of the two or more users to send information pertaining to content playback of the media content item selected, the information comprising playback status, identification of the media content item, and a current time code associated with the media content item;
- based on the information, allow control of content playback on the respective computing devices of other users of the two or more users based at least in part on differences in the information pertaining to the content playback between the respective computing devices;
- receive a request from another user other than the identified remote holder requesting for remote holder status;
- in response to receiving the request, allow the identified remote holder to select to retain the remote holder status or transfer the remote holder status to the other user; and
- when the identified remote holder selects to transfer the remote holder status, then facilitate transfer of the remote holder status to the other user to allow the other user to obtain the control of the content playback.

* * * * *